(12) United States Patent
Nakata et al.

(10) Patent No.: US 8,319,986 B2
(45) Date of Patent: Nov. 27, 2012

(54) METHOD OF PROTECTING LEAKAGE OF INFORMATION AND INFORMATION PROCESSING APPARATUS AND DRIVER PROGRAM IMPLEMENTING THE SAME

(75) Inventors: Hiroaki Nakata, Kawasaki (JP); Masanori Aritomi, Tokyo (JP); Tatsuro Uchida, Yokohama (JP); Yasuhiro Kujirai, Maidenhead (GB)

(73) Assignee: Canon Kabushiki Kaisha, Tokyo (JP)

( * ) Notice: Subject to any disclaimer, the term of this patent is extended or adjusted under 35 U.S.C. 154(b) by 1470 days.

(21) Appl. No.: 11/372,267

(22) Filed: Mar. 9, 2006

(65) Prior Publication Data

US 2006/0215202 A1 Sep. 28, 2006

(30) Foreign Application Priority Data

Mar. 17, 2005 (JP) ................. 2005-077615

(51) Int. Cl.
*G06K 15/00* (2006.01)
*G06F 3/12* (2006.01)
(52) U.S. Cl. .............. 358/1.15; 358/1.14; 358/1.16
(58) Field of Classification Search ............ None
See application file for complete search history.

(56) References Cited

U.S. PATENT DOCUMENTS

| | | | | |
|---|---|---|---|---|
| 5,798,766 | A * | 8/1998 | Hayashi et al. | 345/595 |
| 6,417,931 | B2 * | 7/2002 | Mori et al. | 358/1.15 |
| 6,618,566 | B2 | 9/2003 | Kujirai et al. | |
| 6,807,388 | B1 | 10/2004 | Kojima et al. | 399/80 |
| 2002/0113995 | A1 * | 8/2002 | Evans et al. | 358/1.15 |
| 2003/0107777 | A1 * | 6/2003 | Yamade et al. | 358/442 |
| 2003/0217038 | A1 | 11/2003 | Kageyama et al. | |
| 2004/0070785 | A1 * | 4/2004 | Ferlitsch | 358/1.15 |
| 2005/0052693 | A1 * | 3/2005 | Kadota | 358/1.15 |
| 2005/0280836 | A1 * | 12/2005 | Ferlitsch | 358/1.1 |

FOREIGN PATENT DOCUMENTS

| | | |
|---|---|---|
| JP | 09-258921 | 10/1997 |
| JP | 2000-253241 | 9/2000 |
| JP | 2001-134395 | 5/2001 |
| JP | 2001-312396 | 11/2001 |
| JP | 2002-149371 | 5/2002 |
| JP | 2003-044337 | 2/2003 |
| JP | 2003-127473 | 5/2003 |
| JP | 2003-288327 | 10/2003 |
| JP | 2003-330677 | 11/2003 |
| JP | 2003-337728 | 11/2003 |
| JP | 2004-272784 | 3/2004 |
| JP | 2004-118243 | 4/2004 |
| JP | 2004-302654 | 10/2004 |

* cited by examiner

*Primary Examiner* — Ming Hon
(74) *Attorney, Agent, or Firm* — Cowan, Liebowitz & Latman, P.C.

(57) ABSTRACT

To generate print jobs to be executed by a printing device, an image processing apparatus edits drawing commands output by applications and stored in storage means, in accordance with editing instructions input through input means, executes a process of generating chasing data using the drawing commands, the process including the edition, and then executes a process of generating print data, the process including the edition. The editing instructions for the drawing commands include an instruction to combine a plurality of drawing commands, an instruction to separate a drawing command into a plurality of subcommands, and an instruction to delete a drawing command. The chasing data is generated so as to have a layered data structure indicating the combinative relationship among the plurality of drawing commands if the editing instruction instructs a plurality of drawing commands to be combined together.

9 Claims, 30 Drawing Sheets

FIG. 2B

| ROM (3) | | |
|---|---|---|
| | OS | 3a |
| | DATA / PARAMETER | 3b |

| RAM (2) | | |
|---|---|---|
| | IMAGE DESCRIPTION DATA | 2a |
| | INTERMEDIATE CODE DATA | 2b |
| | BIT MAP DATA | 2c |
| | JOB CHASING SETTING INFORMATION | 2d |
| | JOB CHASING CREATED DATA | 2e |
| | JOB CHASING RESULT DATA | 2f |
| | SPOOLER FLAG | 2g |
| | SPOOL FILE MANAGER FLAG | 2h |
| | DESPOOLER FLAG | 2i |
| | UI INFORMATION | 2j |
| | JOB EDITING LIST | 2k |
| | OTHER DATA / PARAMETERS | |
| | PROGRAM LOAD AREA | 2m |

| EXTERNAL MEMORY (11) | | |
|---|---|---|
| | SPOOL FILE | 11a |
| | APPLICATION | 11b |
| | GRAPHIC ENGINE | 11c |
| | PRINTER DRIVER | 11d |
| |    GRAPHICS CONTROL MODULE | 11d1 |
| |    UI CONTROL MODULE | 11d2 |
| |    SPOOLER MODULE | 11d3 |
| |    SPOOL FILE MANAGER MODULE | 11d4 |
| |    JOB EDITING AND PREVIEWING INTERFACE MODULE | 11d5 |
| |    DESPOOLER MODULE | 11d6 |
| |    JOB CHASING UI CONTROL MODULE | 11d7 |
| |    JOB CHASING PROCESSING MODULE | 11d8 |
| | SYSTEM SPOOLER | 11e |
| | JOB CHASING MANAGEMENT | 11f |
| | OTHER DATA / PROGRAMS | 11g |

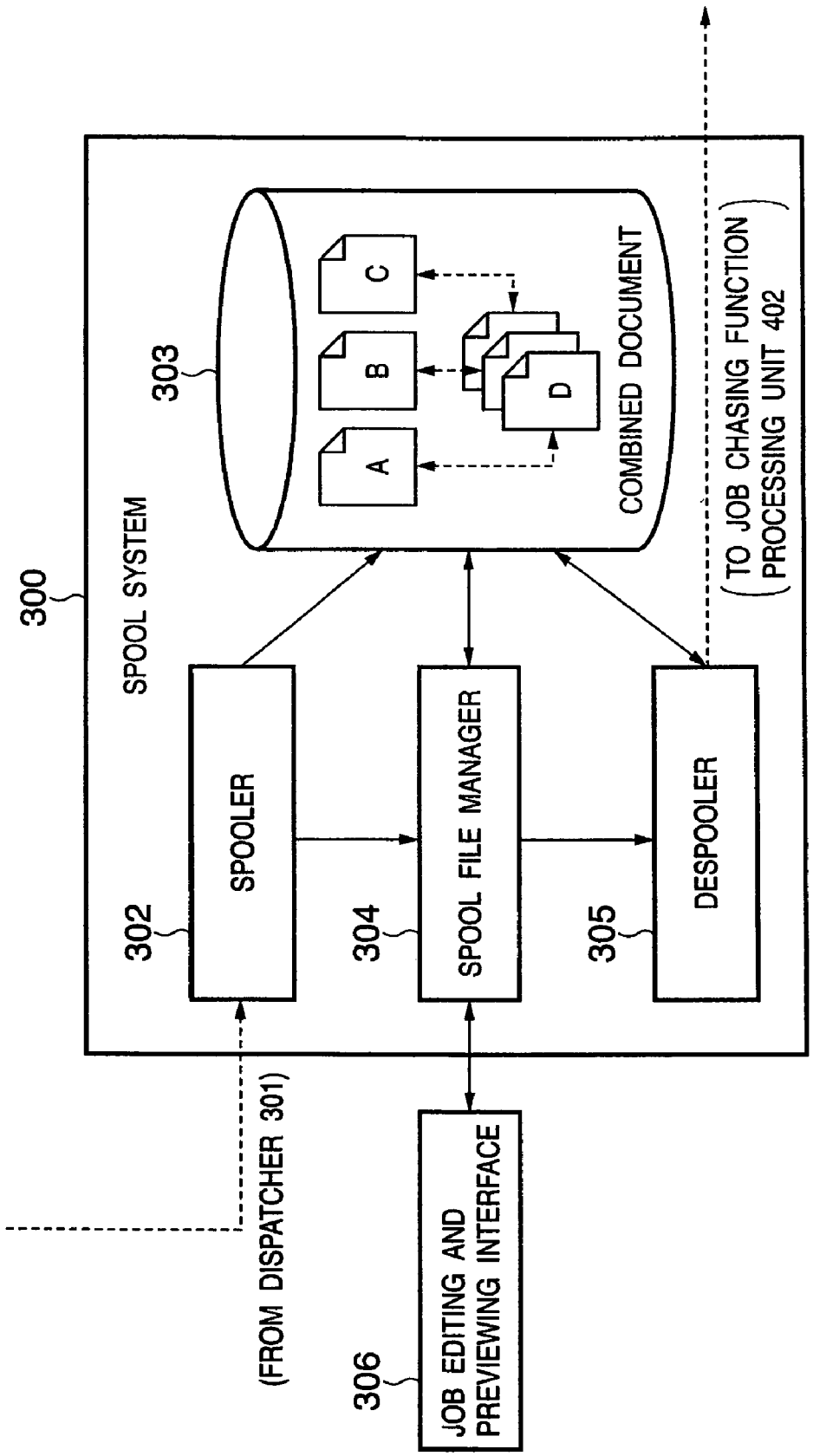

FIG. 10

```
<JobInformation>
        <JobName>DOCUMENT 1</JobName>
        <AppName>DOCUMENT SOFTWARE</AppName>
</JobInformation>
```

FIG. 11

```
<JobInformation>
        <JobName>COMBINED DOCUMENT 1
                <JobName>THESIS 1</JobName>
                <JobName>GRAPH 1</JobName>
                <JobName>SPREADSHEET 1</JobName>
        </JobName>
        <AppName>SpoolSystem 1
                <AppName>DocSoft 1</AppName>
                <AppName>GraphSoft 1</AppName>
                <AppName>TableSoft 1</AppName>
        </AppName>
</JobInformation>
```

METHOD OF PROTECTING LEAKAGE OF INFORMATION AND INFORMATION PROCESSING APPARATUS AND DRIVER PROGRAM IMPLEMENTING THE SAME

FIELD OF THE INVENTION

The present invention relates to a method of protecting leakage of information and an information processing apparatus and a driver program which implement the method, and in particular, to a method of protecting leakage of information which method is used in a system having an information processing apparatus such as a personal computer and a printing device such as a printer, to enable contents printed by a printing device to be chased to inhibit leakage of information, as well as an information processing apparatus and a driver program which implements the method.

BACKGROUND OF THE INVENTION

In recent years, secret information such as corporate client information has frequently leaked. Once the leakage of information is made public, a corporation whose client information has leaked out often loses its confidence and suffers heavy expenditure including compensation for damages. In particular, the recent information leakages involve an incomparably larger amount of information than previous ones. Those who manage information thus need to take more appropriate measures for inhibiting leakage of information. This is because the prevalence of digital information, network communications, and mobile equipment has enabled a large amount of information to be accessed at a time and has significantly improved the portability of information. This trend will be inevitably accelerated.

A conventional common technique for inhibiting leakage of information limits those who can access secret information by setting the right to access the secrete information or a storage server that stores it. However, many of the recent information leakages are intentionally committed by insiders who are permitted to access the secrete information. Accordingly, the mere setting of the access right is no longer a sufficient way to inhibit leakage of information.

On the other hand, information to be protected against leakage of information includes not only a large amount of information typified by large corporations' client information but also quantitatively small but qualitatively important information. The latter information can be easily taken out, for example, in the form of printed matter. It has thus been desirable that measures for inhibiting leakage of information be also taken for printing.

Therefore, particularly for network printing systems, means for preventing leakage of information has been improved so as to allow printed contents to be accumulated to enable chasing.

Various means for inhibiting leakage of information have thus been proposed. Examples are listed below.

(1) Method of setting print permission information for a document to be printed or for print data so that the information can be referenced for actual printing (see, for example, Japanese Patent Laid-Open No. 2004-272784).

(2) Method of authenticating users who attempt to utilize devices connected to a network (see, for example, Japanese Patent Laid-Open No. 2003-288327)

(3) Method of storing print data in a print server so that the data can be reprinted and storing a print log by acquiring information such as a job name, a client name, or a user name and adding a time stamp to the information or generating a bit map from the print data (see, for example, Japanese Patent Laid-Open No. 2002-149371).

(4) Method of acquiring a print log of a printer in addition to that of the print data and storing the log in the server (see, for example, Japanese Patent Laid-Open No. 2003-330677).

(5) Method of allowing the print server to receive information required to identify a user uniquely, from a client simultaneously with the reception of the print data and to generate a print log on the basis of the print data and user information to enable retrievals, browsing, and reprinting (see, for example, Japanese Patent Laid-Open No. 2004-118243).

The following method has been proposed as a technique relating to a print output program such as a printer driver: combining a plurality of documents into one print document by storing print outputs for the documents generated by applications in spool files as intermediate data and editing the intermediate data on the spooled plurality of documents (see, for example, Japanese Patent Laid-Open No. 2001-134395).

However, a special application or a network device such as a special printer is required for the embedding of print permission information (Japanese Patent Laid-Open No. 2004-272784) and the user authentication (Japanese Patent Laid-Open No. 2003-288327) in the above conventional examples. The application of these methods is thus limited. Specifically, when these methods are used in an office that deals with secret information such as personal information in its daily operations, the environment to which the methods are applicable is limited by the introduction of a special print application or a network device such as a special printer.

In contrast, the methods described in Japanese Patent Laid-Open Nos. 2002-149371, 2003-330677, and 2004-118243 are not limited as described above; these methods can be used in a general office without any serious problem and enable print content information to be collected, accumulated, and chased as far as printing via a print server is concerned. However, the methods described in Japanese Patent Laid-Open Nos. 2002-149371, 2003-330677, and 2004-118243 allow printing to be achieved only via a print server. In other words, these methods cannot deal with transmission forms such as the one in which a client PC transmits print data directly to a printing device such as a printer or with local port connections or network protocol-based connections. The print server, which is responsible for all the printing, needs not only to execute normal printing processes but also to collect or generate print content information. Printing performance is thus expected to be degraded if a plurality of clients PC almost simultaneously issue print requests to the same printer. These methods of course involve the installation of a print server and thus require a space in which the print server is physically installed.

Japanese Patent Laid-Open No. 2001-134395 provides a printing system that allows a user to execute editions such as combination, division, and deletion on print jobs in accumulating printed contents so as to enable information to be chased. Even if the user can operate this system to change the print content information, print content information to be surely accumulated so as to be chased later needs to be prevented from being altered or missing. This is required to realize a network printing system providing accurate chasing information.

However, the method described in Japanese Patent Laid-Open No. 2001-134395 spools a plurality of documents output by applications and edits and combines the spooled documents together. The resulting document is thus free from the names of the original documents, corresponding to their attributes, and instead has a new name such as "Combined Document 1". The names of the applications having created the original documents are also lost, with job editing module names (for example, "CPC1.exe") provided to the applications instead. Consequently, if chasing data is managed as a print log, the original document names and application names, the attributes of the original documents, may disadvantageously be lost.

The above description of the conventional problems has focused on the network printing system. However, any of the above problems may occur whenever measures are taken to inhibit leakage of information in connection with reading or outputting of secret information from or via any media. These problems need to be avoided whenever measures are taken to inhibit leakage of information; the avoidance of the problems is not limited to the network printing system.

SUMMARY OF THE INVENTION

In view of the above problems, the present invention provides a method of protecting leakage of information which method is used in a system allowing a user to manipulate jobs, to enable output contents to be accumulated and chased without the need for a special application or a device having a special function, as well as an information processing apparatus and a driver program which implement the method.

In other words, the present invention enables the inhibition of leakage of information to be carried out in an arbitrary form, for example, enables the distribution of a load or eliminates the need for a special information processing apparatus in inhibiting leakage of information.

Even with a system allowing the user to manipulate jobs, the present invention can prevent an alteration or missing of read or output content information to be surely accumulated so as to be chased later.

An object of the present invention is to apply the present invention to a network printing system allowing the user to manipulate jobs to obtain a system that enables printed contents to be accumulated and chased without the need for a special print application or a network device such as a special printer or for restrictions on a print path.

Another object of the present invention is to provide a network printing system meeting the above object and enabling the inhibition of leakage of information to be carried out in an arbitrary form, for example, enabling the distribution of a load or eliminating the need for a special information processing apparatus in inhibiting leakage of information.

Another object of the present invention is to provide a network printing system that allows the user to manipulate print jobs but which can prevent an alteration or missing of print content information to be surely accumulated so as to be chased later.

To accomplish these objects, the present invention provides an information processing apparatus that generates print jobs to be executed by a printing apparatus, the apparatus comprising storage means for storing drawing commands output by applications, editing means for editing drawing commands in the storage means in accordance with editing instructions input through input means, chasing data generation means for executing a process of generating chasing data using the drawing commands read from the storage means, the process including the edition carried out by the editing means, and print data generation means for executing a process of generating print data using the drawing commands read from the storage means, the process including the edition carried out by the editing means using the drawing commands read from the storage means.

The editing instructions for the drawing commands include an instruction to combine a plurality of drawing commands, an instruction to separate a drawing command into a plurality of subcommands, and an instruction to delete a drawing command. The chasing data generation means generates the chasing data having a layered data structure indicating the combinative relationship among the plurality of drawing commands if the editing instruction instructs a plurality of drawing commands to be combined together. The input means enables the inputting of an instruction to preview print data generated by the print data generation means. The information processing apparatus further comprises outputting means for outputting a previewing screen for print data generated by the print data generation means. The information processing apparatus further comprises control means for performing control such that processes of generating chasing data and print data can be consecutively executed; the former process is executed by the chasing data generation means and the latter process is executed by the print data generation means. The input means allows instructions to be input using a user interface of a printer driver.

The present invention also provides a method of protecting leakage of information in an information processing apparatus that generates print jobs to be executed by a printing device, the method comprising an editing step of editing drawing commands output by applications and stored in storage means, in accordance with editing instructions input through input means, a chasing data generating step of executing a process of generating chasing data using the drawing commands read from the storage means, the process including the edition carried out in the editing step, and a print data generating step of executing a process of generating print data using the drawing commands read from the storage means, the process including the edition carried out in the editing step.

The editing instructions for the drawing commands include an instruction to combine a plurality of drawing commands, an instruction to separate a drawing command into a plurality of subcommands, and an instruction to delete a drawing command. The chasing data generating step generates the chasing data having a layered data structure indicating the combinative relationship among the plurality of drawing commands if the editing instruction instructs a plurality of drawing commands to be combined together. The input means enables the inputting of an instruction to preview print data generated by the print data generation means. The method further comprises an outputting step of outputting a previewing screen for print data generated in the print data generating step. Processes of generating the chasing data and print data are consecutively executed by consecutively reading and outputting corresponding drawing commands from the storage means. The input means allows instructions to be input using a user interface of a printer driver.

The present invention further provides a driver program that implements the method of protecting leakage of information and storage media in which the driver program is readably stored.

The present invention provides a network printing system that allows the user to manipulate jobs and which enables read or output contents to be accumulated and chased without the need for a special print application or a device having a special function or for restrictions on an read or output path, as well as an information processing apparatus and a driver program which implement the method.

Specifically, the present invention enables the inhibition of leakage of information to be carried out in an arbitrary form, for example, enables the distribution of a load or eliminates the need for a special information processing apparatus in inhibiting leakage of information.

Even with a system allowing the user to manipulate jobs, the present invention can prevent an alteration or missing of read or output content information to be surely accumulated so as to be chased later.

Applying the present invention to a network printing system allowing the user to manipulate jobs provides a system that enables printed contents to be accumulated and chased without the need for a special print application or a network device such as a special printer or for restrictions on the print path.

The present invention can further provide a network printing system enabling the inhibition of leakage of information to be carried out in an arbitrary form, for example, enabling the distribution of a load or eliminating the need for a special information processing apparatus in inhibiting leakage of information.

The present invention can further provide a network printing system that allows the user to manipulate print jobs but which can prevent an alteration or missing of print content information to be surely accumulated so as to be chased later.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2B is a diagram schematically showing an example of structure of a memory space in the host computer 3000 in accordance with the present embodiment;

FIG. 5 is a function block diagram showing an example of an expanded arrangement for a job editing and previewing interface in the host computer 3000 in accordance with the present embodiment;

FIG. 10 is a diagram showing a form of job level chasing information on a job;

FIG. 11 is a diagram showing a form of job level chasing information on a combined job;

DETAILED DESCRIPTION OF THE PREFERRED EMBODIMENTS

Embodiments of the present invention will be described below in detail with reference to the drawings. The embodiments show an example in which the present invention is applied to a network printing system. However, the present invention is not limited to the network printing system; as previously described, the present invention solves the problems that may occur whenever measures are taken to inhibit leakage of information in connection with reading or outputting of secret information from or via any media.

First Embodiment

Figure 1:
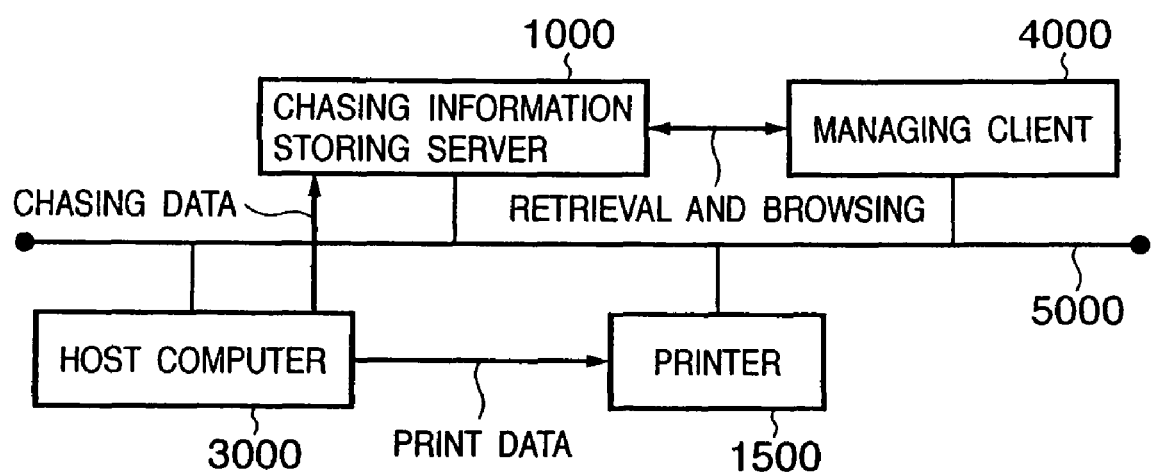
FIG. 1 is a block diagram showing the configuration of a printing system in accordance with the present embodiment.

Example of Configuration of a Network Printing System to which the Present Invention is Applied FIG. 1 is a block diagram showing an example of configuration of a printing system in accordance with an embodiment of the present invention.

The present printing system is composed of a host computer 3000 (information processing apparatus in accordance with the present invention), a printer 1500, a chasing information storing server 1000, and a managing client 4000 which are connected to a network 5000. The network 5000 may be a wired LAN or public line, or radio mobile communications.

The host computer 3000, the information processing apparatus in accordance with the present invention, accepts a print request from a user. The host computer 3000 generates print data in accordance with the contents of the print request and then transmits it to the printer 1500. The host computer 3000 further extracts or generates chasing data meeting the print request and then transmits it to the chasing information storing server 1000. The printer 1500 executes a printing process in accordance with the received print data. The chasing information storing server 1000 registers and stores the chasing data received from the host computer 3000, in a storage area constructed in itself or in another information apparatus, as a database. The managing client 4000 is used by a system manager to retrieve or browse chasing data registered in the database, as required.

The managing client 4000 may be the same information apparatus that constitutes the chasing information storing server 1000.

<Example of Hardware Configuration of the Network Printing System in Accordance with the Present Embodiment>

Figure 2A:
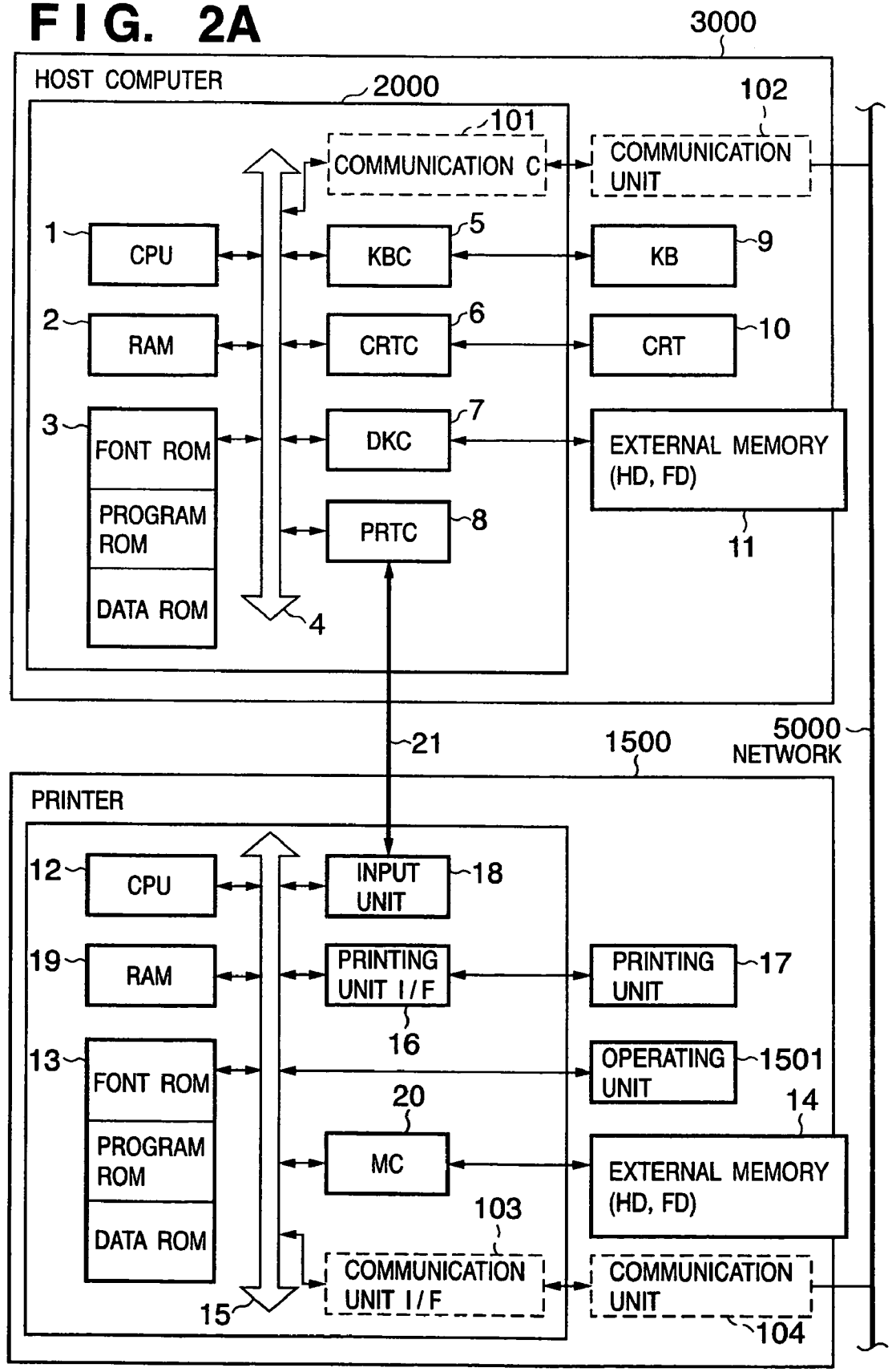
FIG. 2A is a block diagram showing an example of the hardware configuration of a host computer 3000 and a printer 1500 in accordance with the present embodiment.

FIG. 2A is a block diagram showing an example of hardware configuration of the host computer 3000 and printer 15000 constituting the network printing system in accordance with the present embodiment. The present invention is applicable to a unitary apparatus, a system consisting of a plurality of apparatuses, or a system composed of apparatuses connected together via a network such as a LAN or WAN to execute processes via the network.

(Host Computer 3000)

In FIG. 2A, the host computer 3000 comprises a CPU 1 that controls document processes including those in accordance with the embodiments of the present invention, described later, as well as print processes based on the document processes; the CPU 1 executes the document processes on documents containing a mixture of graphics, images, letters, and charts (including spreadsheets) on the basis of a document processing program or the like stored in a program ROM contained in a ROM 3 or in an external memory 11. The CPU 1 integrally controls the devices connected to a system bus 4. The program ROM contained in the ROM 3 or the external memory 11 stores, for example, an operating system program (hereinafter referred to as an OS) serving as a control program for the CPU 1. The font ROM contained in the ROM 3 or the external memory 11 also stores font data used for the document processed. The data ROM contained in a ROM 3 or in an external memory 11 also stores various data used for the document processes. A RAM 2 functions as a main memory, a work area, or the like for the CPU 1.

A keyboard controller (KBC) 5 controls key inputs via a keyboard 9 or a pointing device (not shown in the drawings). A CRT controller (CRTC) 6 controls display provided by a CRT display (CRT) 10. Reference numeral 7 denotes a disk controller (DKC) that controls accesses to the external memory 11 such as a hard disk (HD) or a floppy (registered trade mark) disk (FD) which stores a boot program, various applications, font data, user files, edition files, a printer control command generating program (hereinafter referred to as a printer driver), and the like. A printer controller (PRTC) 8 is connected to the printer 1500 via a bidirectional interface (interface) 21 to execute a process of controlling communications with the printer 1500. A communication controller (communication C) 101 uses a communication unit 102 to communicate with other apparatuses via the network 5000. The printer 1500 may be controlled by the communication controller (communication C) 101 via the network 5000.

The CPU 1 opens various registered windows to execute various data processes, on the basis of commands specified via a mouse cursor or the like (not shown in the drawings) on the CRT 10. To execute printing, a user can open a window for print settings to make settings for the printer and settings for a printing method for the printer driver, including selection of a print mode.

(Example of Storing Structure of the Host Computer 3000)

FIG. 2B is a diagram showing an example of a storing structure in the host computer 3000 which includes the RAM 2, ROM 3, and external memory 11. In FIG. 2B, an address space appears to extend continuously from the top to bottom of the drawing. The storing structure shown in FIG. 2B belongs to an example of an expanded system shown in FIG. 4B and described later. The figure shows information on the characteristic parts of the present embodiment and not information on the other parts of the present embodiment.

The ROM 3 stores a system program 3a such as the OS or BIOS, and fixed data/parameters 3b including fonts.

The succeeding RAM 2 includes a temporarily stored data area and a program load area.

The data area includes an image description data area 2a that stores image description data used in the present embodiment and described in PDL, an intermediate code data area 2b that stores intermediate code data created and analyzed by a graphic engine 202 and spooled in a spool file 303 by a spooler 302, a bit map data area 2c that stores bit data into which the intermediate codes are converted by the graphic engine 202 via a despooler 305, a job chasing setting information area 2d that stores job chasing setting contents in saved data set by a job chasing function UI controlling engine 401 via a user interface shown in FIG. 5 and described later, a job chasing created data area 2e that stores data created by a job chasing function processing unit 402 in accordance with the job chasing setting information and passed to a job chasing managing unit 500, the data being then held in the chasing information storing server 1000, a job chasing result data area 2f that stores the results of management for information leakage inhibition carried out by the job chasing managing unit 500 on the basis of the information held in the chasing information storing server 1000, a spooler flag area 2g that stores spooler flags which are used for processes executed by the spooler 302 and which indicate the start/end of a job and a new page, a spooler file manager flag area 2h that stores spool file manager flags which are used for processes executed by a spool file manager 304 and which indicate, for example, notifications from the spooler 302 and despooler 305, a despooler flag area 2i that stores despooler flags which are used for processes executed by the despooler 305 and which indicate notifications from the spool file manager 304, an end flag, and the like, a UI information area 2j that stores information for a UI control unit 203B of the printer driver 203, a job editing list 2k that stores the results of job edition such as a combination of a plurality of jobs or a division or deletion of any job, and other data/parameter area.

An application, a printer engine, or a job chasing managing program from the external memory 11 is loaded into a program load area 2m and executed by the CPU 1. This allows the blocks shown in FIGS. 3 and 4B to execute the corresponding processes.

The succeeding external memory 11 includes a data area to which databases or files are saved and a program area that stores the application, printer engine, and job chasing managing program in accordance with the present embodiment.

The data area has a spool file area 11a that holds intermediate data spooled by the spooler 302.

The program area includes an application area 11b that stores the application 201, a graphic engine area 11c that stores the graphic engine 202, a printer driver area 11d that stores the printer driver 203, a system spooler area 11e that stores a system spooler 204, and a job chasing managing area 11f that stores a program implementing the job chasing managing unit 500.

The printer driver area 11d, the main part of the present embodiment, includes a graphic controlling module 11d1 that implements a graphic control unit 203A, a UI controlling module 11d2 that implements a UI control unit 203B, a spooler module 11d3 that implements the spooler 302, a spool file manager module 11d4 that implements a spool file manager 304, a job editing and previewing interface module 115d that implements a job editing and previewing interface 306, a despooler module 11d6 that implements the despooler 305, a job chasing function UI controlling module 11d7 that implements the job chasing function UI control unit 401, and a job chasing function processing module 11d8 that implements the job chasing function processing unit 402.

The external memory further has other data/program area 11g that is not a characteristic part of the present embodiment.
(Printer 1500)

The printer 1500 in FIG. 2A is controlled by its CPU 12. The printer CPU 12 outputs image signals to a printing unit (printer engine) 17 connected to the system bus 15, as print output information on the basis of, for example, a control program stored in the ROM 13 or an external memory 14. A control program for the CPU 12 and the like are stored in the program ROM of the ROM 13. For example, font data used to generate the print output information is stored in a font ROM of the ROM 13. A data ROM of the ROM 13 stores information utilized on the computer if it has does not have the external memory 14 such as a hard disk.

The CPU 12 can communicate with the computer via an input unit 18. This makes it possible to transmit information in the printer or the like to the computer 3000. A RAM 19 functions as a main memory, a work area, or the like for the CPU 12. The RAM 19 is configured to be able to increase its own memory capacity using an option RAM connected to an expansion port (not shown in the drawings). The RAM 19 is used as an output information expanding area, an environmental data storing area, an NVRAM, or the like.

Accesses to the external memory 14 such as a hard disk (HD) or an IC card are controlled by a memory controller (MC) 20. The external memory 14 is optionally connected to the computer to store font data, an emulation program, form data, and the like. Reference numeral 18 denotes switches for operations on above described operation panel, LED indicators, and the like. A communication controller (communication C) 103 controls a communication unit 104 to communicate with other apparatuses via the network 5000. The printer 1500 may be controlled by the communication controller (communication C) 103 from the host computer 3000 via the network 5000.

The printer 1500 may have an NVRAM (not shown in the drawings) to store printer mode setting information from the operation panel 1501.

The printing unit 17 is an engine based on an electrophotographic system in accordance with the present embodiment. Print data is consequently recorded on media such as paper using toner dots. Of course, the printing system in accordance with the present invention is not limited to the electrophotographic system. The printing device to which the present invention is applicable may be based on any system that forms dots for printing, for example, an ink jet system.
<Example of Process Function Blocks in the Host Computer>

With reference to FIGS. 3, 4A, 4B, and 5, description will be given of an example of a printing process function and an information chasing function in the host computer 3000.
(Example of Basic Configuration of the Function Blocks)

Figure 3:
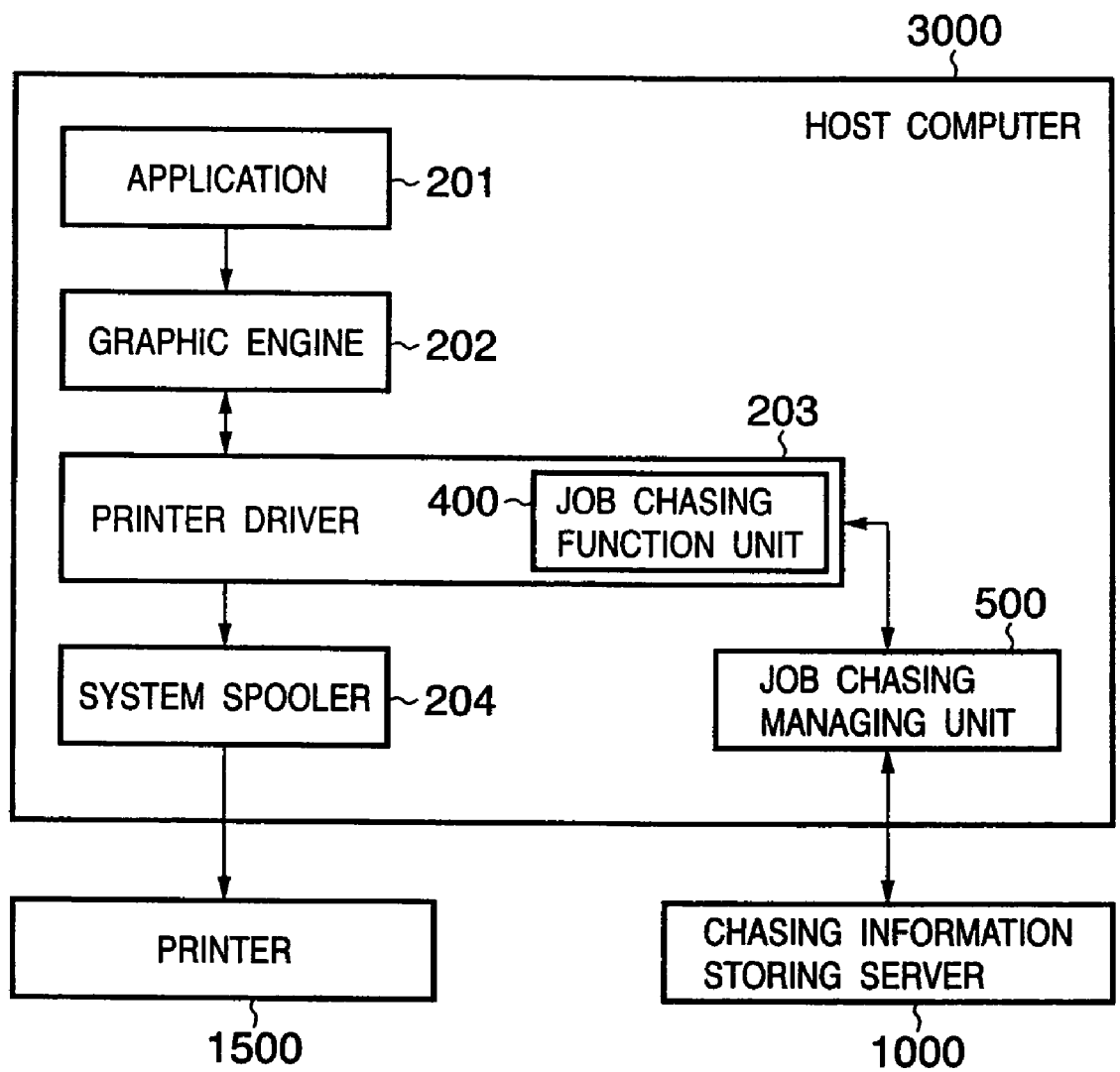
FIG. 3 is a function block diagram showing an example of an arrangement for chasing a print job in the host computer 3000 in accordance with the present embodiment.

FIG. 3 is a block diagram showing an example of a basic configuration for a printing process and information chasing in the computer 3000, shown in FIG. 1.

The application 201, the graphic engine 202 (for example, for Windows (registered trade mark) from Microsoft, U.S., this corresponds to a GDI (Graphic Device Interface) module), that is, a drawing unit of the operation system (hereinafter referred to as the OS), the printer driver 203, and the system spooler 204 are present as files saved to the external memory 11. These files are program modules loaded into the RAM 2 and then executed by the OS or modules utilizing the program modules.

The application 201 and the printer driver 203 can be added to the FD of the external memory 11 or a CD-ROM (not shown in the drawings) or to the HD of the external memory 11 via the network (not shown in the drawing). The application 201 saved to the external memory 11 is loaded and executed in the RAM 2. For printing, the application 201 causes the printer 1500 to output (draw) data, using the graphic engine 202 that has been similarly loaded into the RAM 2 and which is ready for execution.

The graphic engine 202 loads the printer driver 203, provided for each printing device such as a printer, from the external memory 11 into the RAM 2. The graphic engine 202 further makes settings such that outputs from the application 201 are directed to the printer driver 203. The graphic engine 202 converts a GDI (Graphic Device Interface) function received from the application 201, into a DDI (Device Driver Interface) function. The graphic engine 202 then outputs the DDI function to the printer driver 203.

The printer driver 203 converts the DDI function received from the graphic engine 202, into a control command that can be recognized by the printer, for example, a PDL (Page Description Language). The converted printer control command is output to the printer 1500 via the interface 21 through the system spooler 204 loaded into the RAM 2 by the OS as a print data.

The printing system in accordance with the present embodiment has a job chasing function unit 400 in the printer driver 203. The job chasing function unit 400 may be a built-in module of the printer driver 203 or a library module added by individual installation. The printer driver 203 causes the job chasing function unit 400 to generate and extract chasing data and to send it to the job chasing managing unit 500.

The job chasing managing unit 500 receives and transfers chasing data to the chasing information storing server 1000. The job chasing managing unit 500 may process or sort the received chasing data as required. The job chasing managing unit 500 may also receives and transmits the chasing data to the chasing information storing server 1000 at the same time. Alternatively, the job chasing managing unit 500 temporarily stores the chasing data in the storage area of the hard disk or the like and then transmits it to the chasing information storing server 1000 in accordance with a separately specified schedule for transmissions to the chasing information storing server 1000.

(Example of Components of the Function Blocks)

Figure 4A:
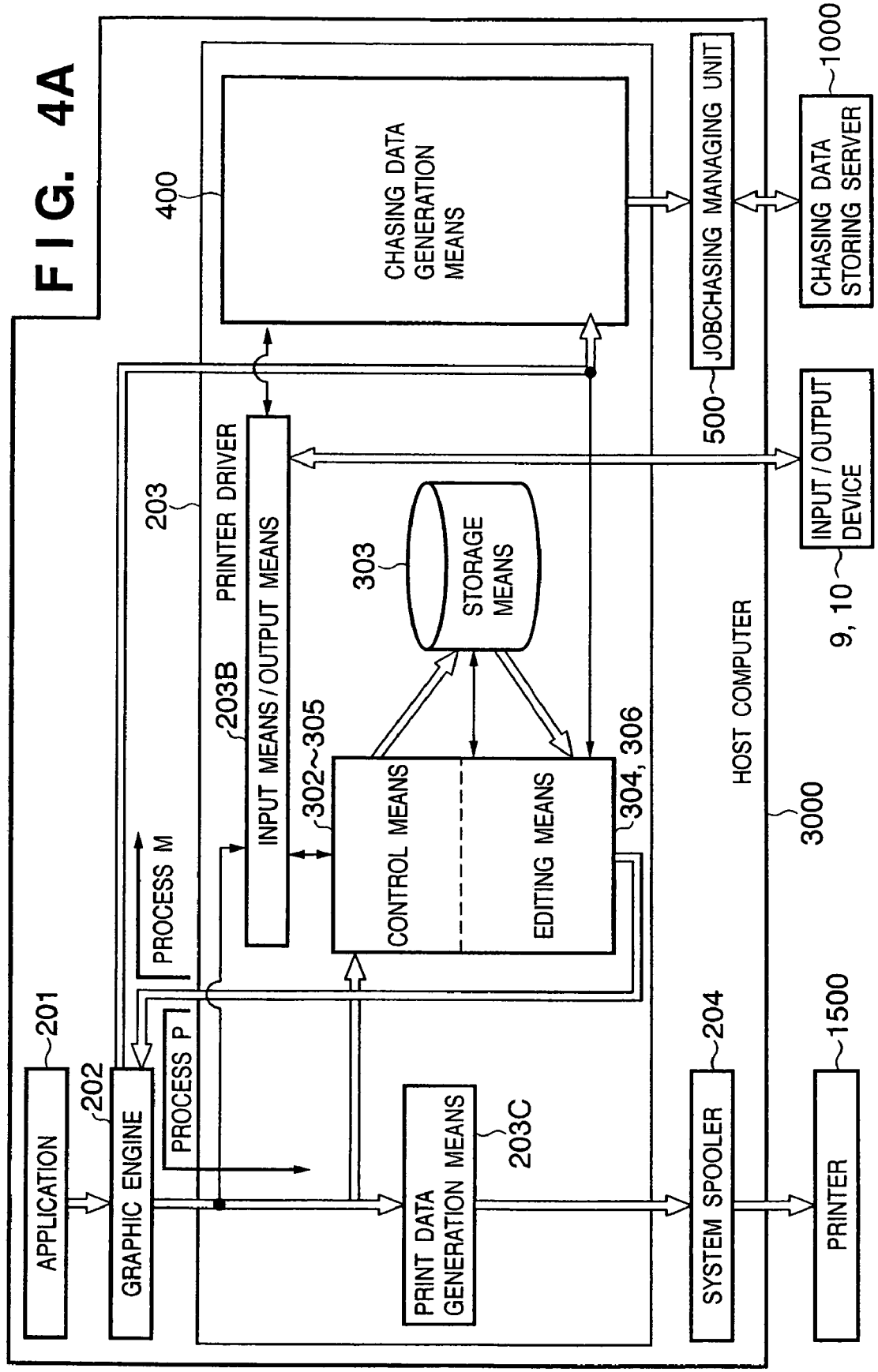
FIG. 4A is a diagram showing the example of the arrangement for chasing a print job in the host computer 3000 in accordance with the present embodiment, in association with components in the claims.

FIG. 4A is a diagram showing an example of configuration of the function blocks in accordance with the present embodiment, in association with the claimed components.

The reference numerals in FIG. 4A correspond to those for the function blocks in accordance with the present embodiment shown below in FIGS. 4B and 5; the components shown by the same reference numeral provide similar functions. To avoid duplication, this paragraph does not describe the functions, which will be described below with reference to FIG. 4B.

(Example of Expanded Configuration of the Function Blocks)

Figure 4B:
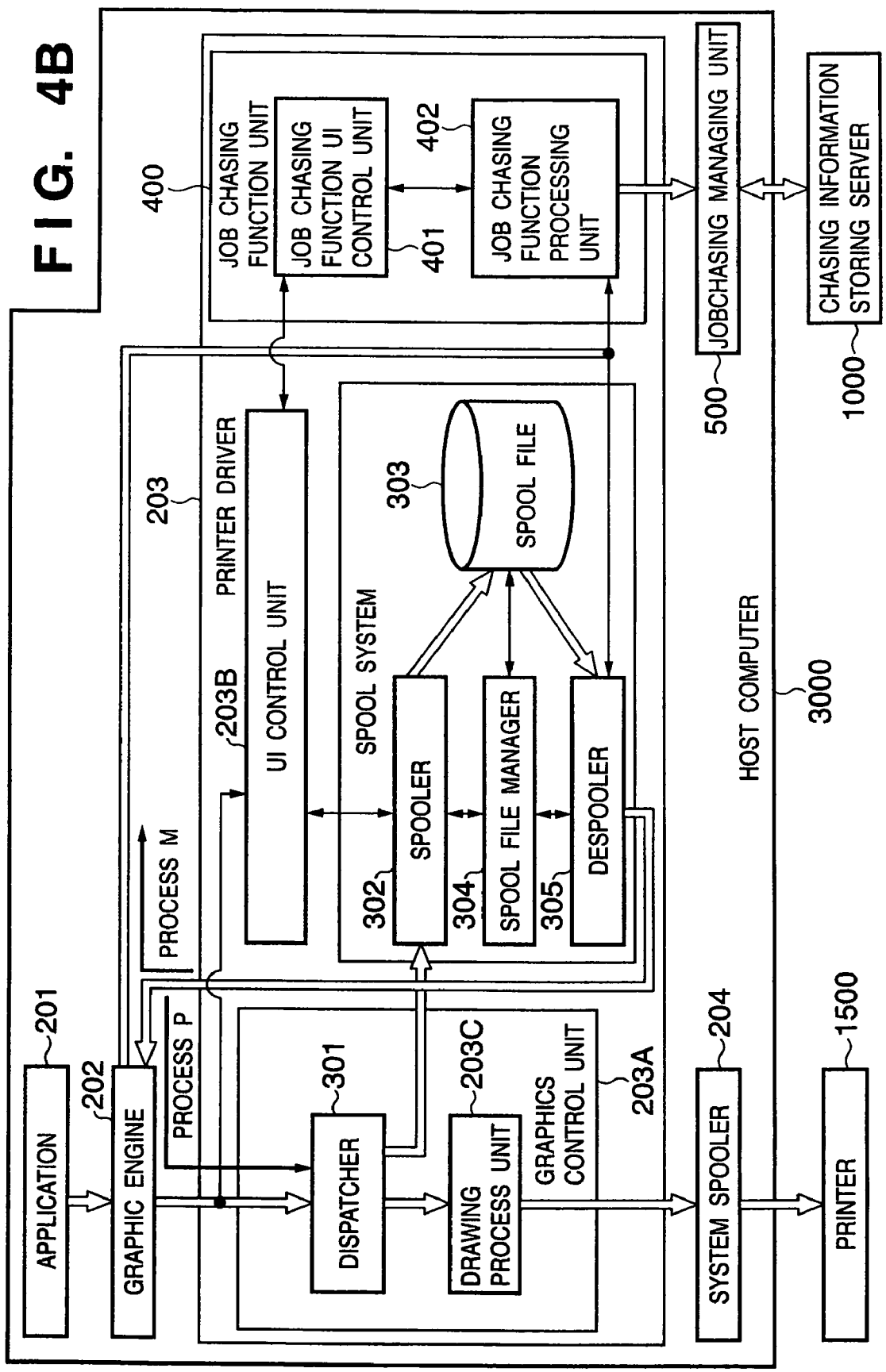
FIG. 4B is a function block diagram showing an example of an expanded arrangement for chasing a print job in the host computer 3000 in accordance with the present embodiment.

FIG. 4B shows an expansion of the system shown in FIG. 3. In the system shown in FIG. 4B, when the graphics engine 202 sends a print command to the printer driver 203, the spool system 300 generates a spool file 303 consisting of intermediate codes. In FIG. 4B, transfers of print data are shown by double lines, whereas connections of control information are shown by single lines for clearing the following operation.

In the system in FIG. 3, the application 201 is released from the printing process when the printer driver 203 has converted all the print commands from the graphic engine 202 into printer control commands. In contrast, in the system in FIG. 4B, the application 201 is released from the printing process when the spooler 302 has converted all the print commands into intermediate code data and then output the data to the spool file 303. The latter operation normally requires a shorter time. In the system shown in FIG. 4B, the contents of the spool file 303 can also be processed. This enables the provision of functions not possessed by the application, such as the enlargement or reduction of print data from the application or the reduction of a plurality of pages to one page for printing.

To achieve these objectives, the system in FIG. 3 is expanded so as to spool intermediate code data as shown in FIG. 4B. To process print data, settings are made from the UI control unit 203, normally provided by the printer driver 203, and are stored on the RAM 2 or external memory 11.

FIG. 4B will be described below in detail. A process M in FIG. 4B indicates a despooler process included in the job chasing function. A process P indicates a despooler process included in a printing process.

As shown in FIG. 4B, in the expanded processing system, a dispatcher 301 receives a DDI function that is a print command from the graphic engine 202. If the print command (DDI function) received from the graphic engine 202 by the dispatcher 301 is based on a print command (GDI function) issued to graphic engine 202 by the application 201, the dispatcher 301 loads the spooler 302 stored in the external memory 11, into the RAM 2. The dispatcher 301 then dispatches the print command (DDI function) to the spooler 302.

The spooler 302 analyzes the received print command and converts it into intermediate codes for each page. The spooler 302 then outputs the intermediate codes to the spool file 303. The spooler 302 further acquires settings (Nup, double side, stapling, color/monochromaticity specification, and the like) for processing of print data which are provided for the UI control unit 203B. The spooler 302 then saves the settings to the spool file 303 as a file for each job. The spool file 303 is generated on the external memory 11 as a file but may be generated on the RAM 2. The spooler 302 further loads the spool file manager 304 stored in the external memory 11, into the RAM 2. The spooler 302 then notifies the spool file manager 304 that the spool file 303 has been generated.

The spool file manager 304 subsequently determines whether or not to be able to achieve printing in accordance with the contents of the settings for the processing of print data which are saved to the spool file 303. If the spool file manager 304 determines that printing can be achieved utilizing the graphic engine 202, it loads the despooler 305 stored in the external memory 11, into the RAM 2. The spool file manager 304 then instructs the despooler 305 to print page drawing files of intermediate codes described in the spool file 303.

The despooler 305 processes the page drawing file of the intermediate codes contained in the spool file 303, in accordance with a job setting file contained in the spool file 303 and including processing setting information. Specifically, the despooler 305 reads in page drawing commands of the intermediate codes to regenerate the GDI function and outputs it via the graphic engine 202 again.

First, to transmit the results of drawing in accordance with the output GDI function to the job chasing function processing unit, the despooler 305 provides an area (device context) for bit map expansion in the RAM 2 and carries out drawing. Chasing information generated is converted, by the job chasing function processing unit 402, into a format readable by the job chasing managing unit 500. The resulting data is then transferred by the job chasing function processing unit 402. It is possible to use a highly convertible conversion format such as an XML format or a format meeting original rules.

The despooler 305 then outputs the GDI function to the dispatcher 301 via the graphic engine 202.

If the print command (DDI function) received from the graphic engine 202 is based on the print command (GDI function) issued to the graphic engine 202 by the despooler 305, the dispatcher 301 sends the print command to a drawing processing unit 203C instead of the spooler 302.

The drawing processing unit 203C generates a printer control command consisting of the page description language (PDL) or the like, on the basis of the DDI function acquired from the graphic engine 202. The drawing processing unit 203C then outputs the printer control command to the printer 1500 via the system spooler 204.

In addition to the above module configuration, the printer driver 203 comprises the job chasing function UI control unit 401 and chasing function processing unit 402 as the job chasing function unit 400, a characteristic arrangement in accordance with the present invention.

<Example of a Spool System Comprising a Job Editing Function and a Previewing Function>

The spool system 300 shown in FIG. 4B can further be expanded by making open to the user an interface having the ability to allow processing settings to be changed before the despooler 305 converts the contents of the spool file 303 into printer control commands, to allow jobs to be combined (job editing function), or to allow a printing form to be displayed and checked (previewing function).

FIG. 5 is a diagram showing an example of an expanded spool system comprising a job editing function and a previewing function.

The job editing and previewing interface 306 interfaces with the spool file manager 304 and comprises a user interface. The job editing and previewing interface 306 is displayed on the CRT 8 and can be manipulated through the keyboard 9 or a mouse (not shown in the drawings). The user can give various instructions to the spool file manager 304 through the job editing and previewing interface 306: instructions to preview jobs, to change printing or processing settings, to combine a plurality of jobs, and to divide or delete any job.

Figure 6A:
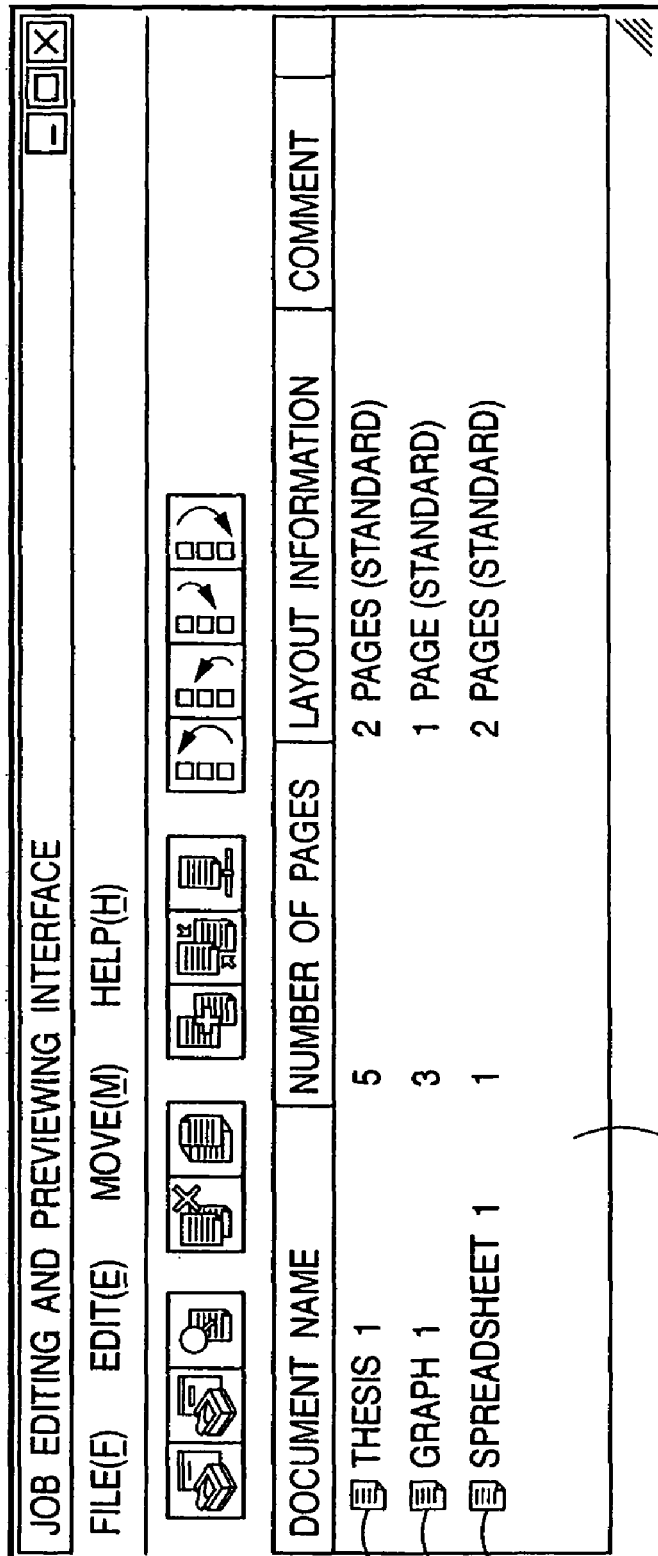
FIG. 6A is a diagram showing an example of a display screen for the job editing and previewing interface before job edition.
Figure 6B:
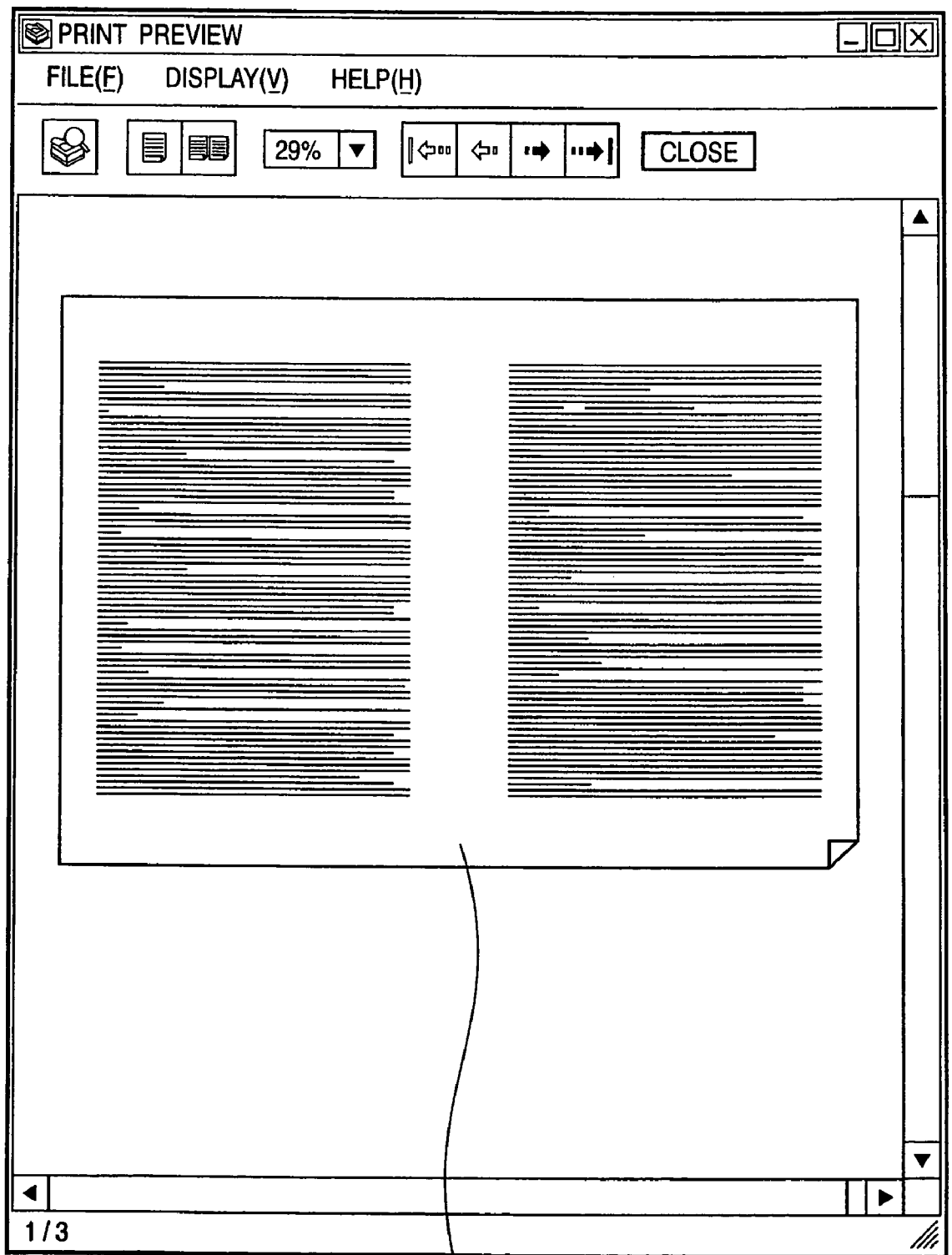
FIG. 6B is a diagram showing an example of a print previewing display screen for the job editing and previewing interface before job edition.
Figure 6C:
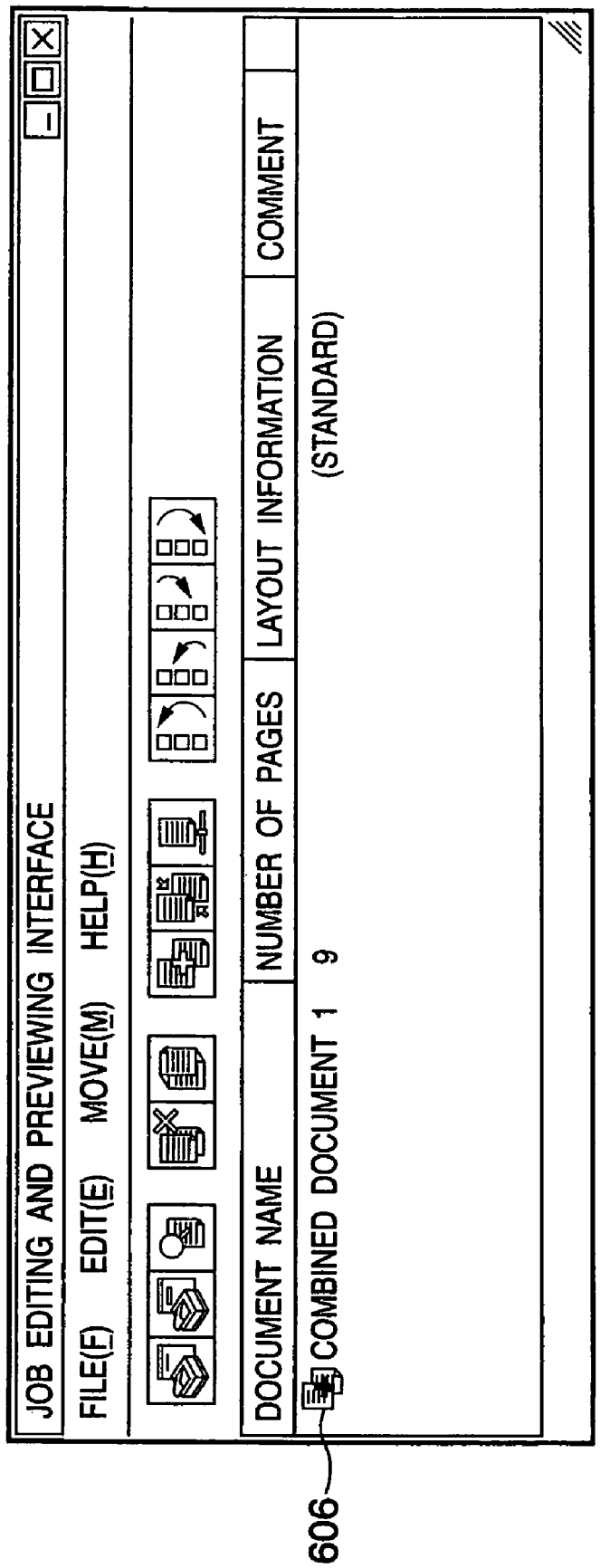
FIG. 6C is a diagram showing an example of the display screen for the job editing and previewing interface after job edition.

FIGS. 6A, 6B, and 6C are diagrams showing an example of the job editing and previewing interface 306. With reference to these figures and FIG. 5, the combination of jobs will be described.

Upon receiving a DDI function that is a print command, the dispatcher 301 first loads the spooler 302 stored in the external memory 11, into the RAM 2. The dispatcher 301 then dispatches the print command (DDI function) to the spooler 302. The spooler 302 analyzes the received print command and converts it into intermediate codes for each page. The spooler 302 then outputs the intermediate codes to the spool file 303.

The spool system 300 is not loaded/unloaded every time the application 201 executes a printing process but can always be activated. The spool system 300 can accordingly receive a plurality of print jobs from one application or receive a plurality of print jobs from a plurality of applications to spool the jobs internally.

For example, it is assumed that three different jobs from the respective applications are sequentially printed and that the spool files spooled in the above steps for the spool system are defined as spool files 302A, 302B, and 302C.

When notified by the spooler 302 that a spool file has started to be generated, the spool file manager 304 reads in the settings for the UI control unit 203B provided by the printer driver 203. If the job editing and previewing function is effectively set, the spool file manager 304 loads and displays the job editing and previewing interface 306 on the CRT 8 as a user interface. The spool file manager 304 further monitors the advance of spool file generation for each page to display the advance on the job editing and previewing interface 306. The spool files 302A, 302B, and 302C are expressed as spool jobs on the job editing and previewing interface 306 in the order in which the spool files were printed. The order of the spool jobs spooled in the spool system 300 is the same as that in which the jobs were introduced into the spool system 300. This order is managed by the spool file manager 304 by recording it in the RAM 2 as list information.

The diagram shown in FIG. 6A shows that the spools in the spool files 302A, 302B, and 302C have been sequentially completed and are displayed in a list view 604 on the user interface as independent spool jobs 601, 602, and 603.

The list 601 on the user interface displays document names, the numbers of pages, layout information, and the like so as to enable the documents to be recognized as separate jobs. Now, one of the spool jobs, the spool job 601 is selected through the keyboard 9 or the mouse (not shown in the drawings), and a print previewing instruction is given to the spool file manager 304 through the job editing and previewing interface 306. Then, the spool file manager 304 reads in the intermediate codes from the spool file 303A, corresponding to the spool job 601. The spool file manager 304 thus generates a preview image.

The preview image generated is transferred again to the job editing and previewing interface 306 through the spool file manager 304. The job editing and previewing interface 306 then loads and displays the preview window 605 shown in FIG. 6B, on the CRT 8. The preview window 605 enables the check of a form similar to that actually printed by the printer 1500, at a desired scale for each page. In the example in FIG. 6B, a print job generated by thesis creating software is displayed in a 2up form.

Now, the combination of jobs will be described.

One of the spool jobs 601, 602, and 603 is selected through the keyboard 9 or the mouse (not shown in the drawings), and a job combining instruction is given. The spool file manager 304 changes the list information on the spool jobs managed on the RAM 2 by itself from a state in which the spool jobs 601, 602, and 603 are independent of one another to a state in which the spool jobs are combined. The contents of the list view 604 on the job editing and previewing interface 306 are changed to display a combined spool job 606 into which the three spool jobs have been combined.

FIG. 6C shows the job editing and previewing interface 306 in which a combined spool job 606 has been generated by an editing operation.

Finally, description will be given of job chasing and printing of a spool job. Printing of the combined spool job 606, shown in FIG. 6C, will be considered. A spool job printing instruction is given to the spool file manager 304 through the job editing and previewing interface. The spool file manager 304 then references the list information managed on the RAM 2 to determine that the spool jobs 601, 602, and 603 has been combined into one job. The despooler 305 stored in the external memory 11 is then loaded into the RAM 2. The despooler 305 is instructed to execute one printing process to print the page drawing files of the intermediate codes described in the spool files 303A, 303B, and 303C.

The despooler 305 sequentially and continuously reads in the page drawing commands of the intermediate codes described in the spool files 303A, 303B, and 303C. To transmit the results of drawing in accordance with the read-in page drawing commands to the job chasing function processing unit, the despooler 305 provides an area (device context) for bit map expansion in the RAM 2 and carries out drawing. Chasing information generated is converted, by the job chasing function processing unit 402, into a format readable by the job chasing managing unit 500. The resulting data is then transferred by the job chasing function processing unit 402. It is possible to use the XML format or the like, or a format meeting original rules. The despooler 305 then outputs a GDI function to the dispatcher 301 via the graphic engine 202.

If the print command (DDI function) received from the graphic engine 202 is based on a print command (GDI function) issued to the graphic engine 202 by the despooler 305, the dispatcher 301 sends the print command to the drawing processing unit 203C instead of the spooler 302. The drawing processing unit 203C generates a printer control command consisting of the page description language or the like, on the basis of the DDI function acquired from the graphic engine 202. The drawing processing unit 203C then outputs the printer control command to the printer 1500 via the system spooler 204. A GDI function is regenerated and output via the graphic engine 202 again. A print job thus regenerated by the spool system is recognized by the system spooler 204 or printer 1500 as a single job.

Description has been given of the configuration of the print processing device and information chasing device in the host computer 3000.

<Description of an Example of the Job Chasing Function UI>

Figure 7A:
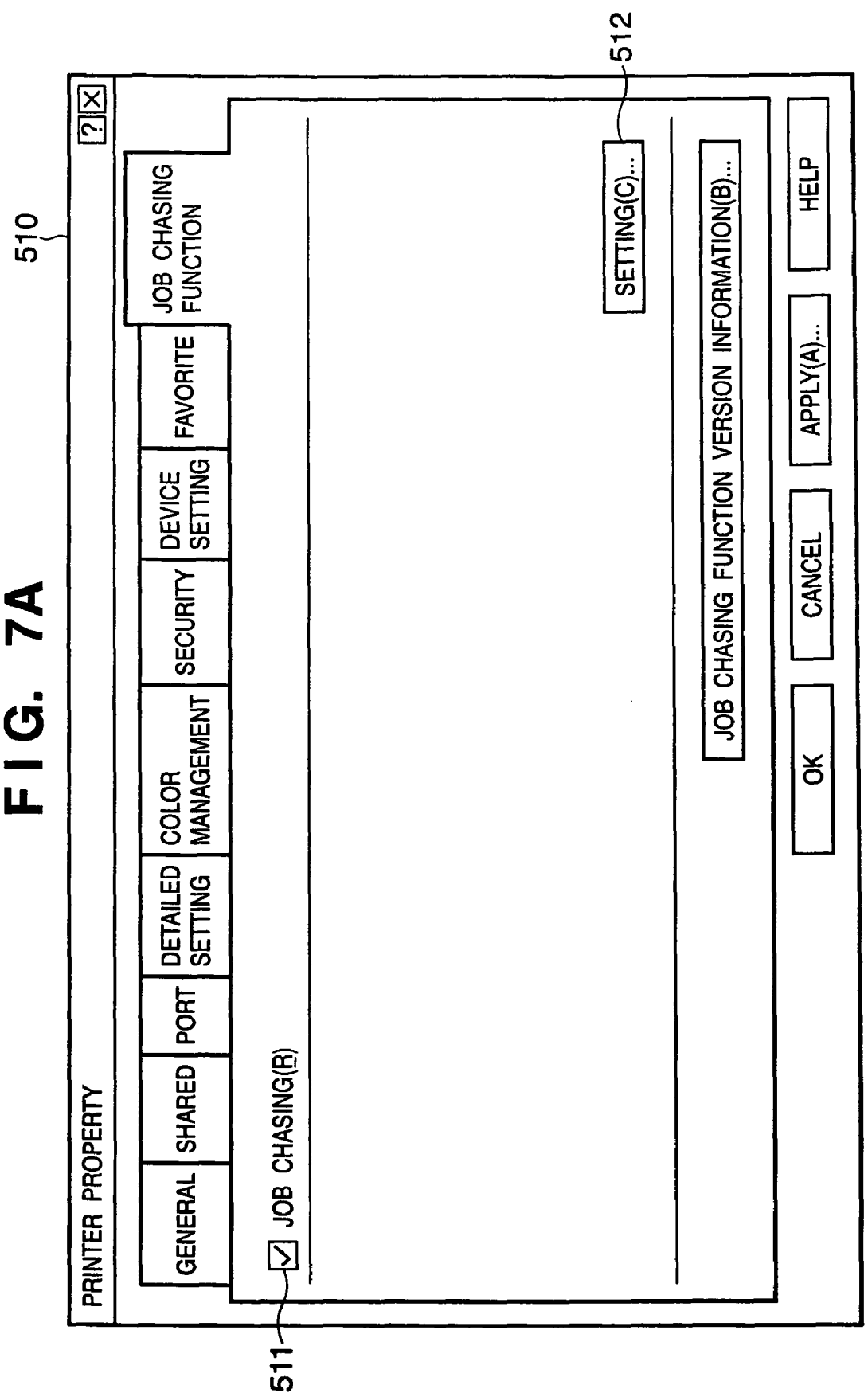
FIG. 7A is a diagram showing an example of an initial screen of a user interface for a job chasing function.
Figure 7B:
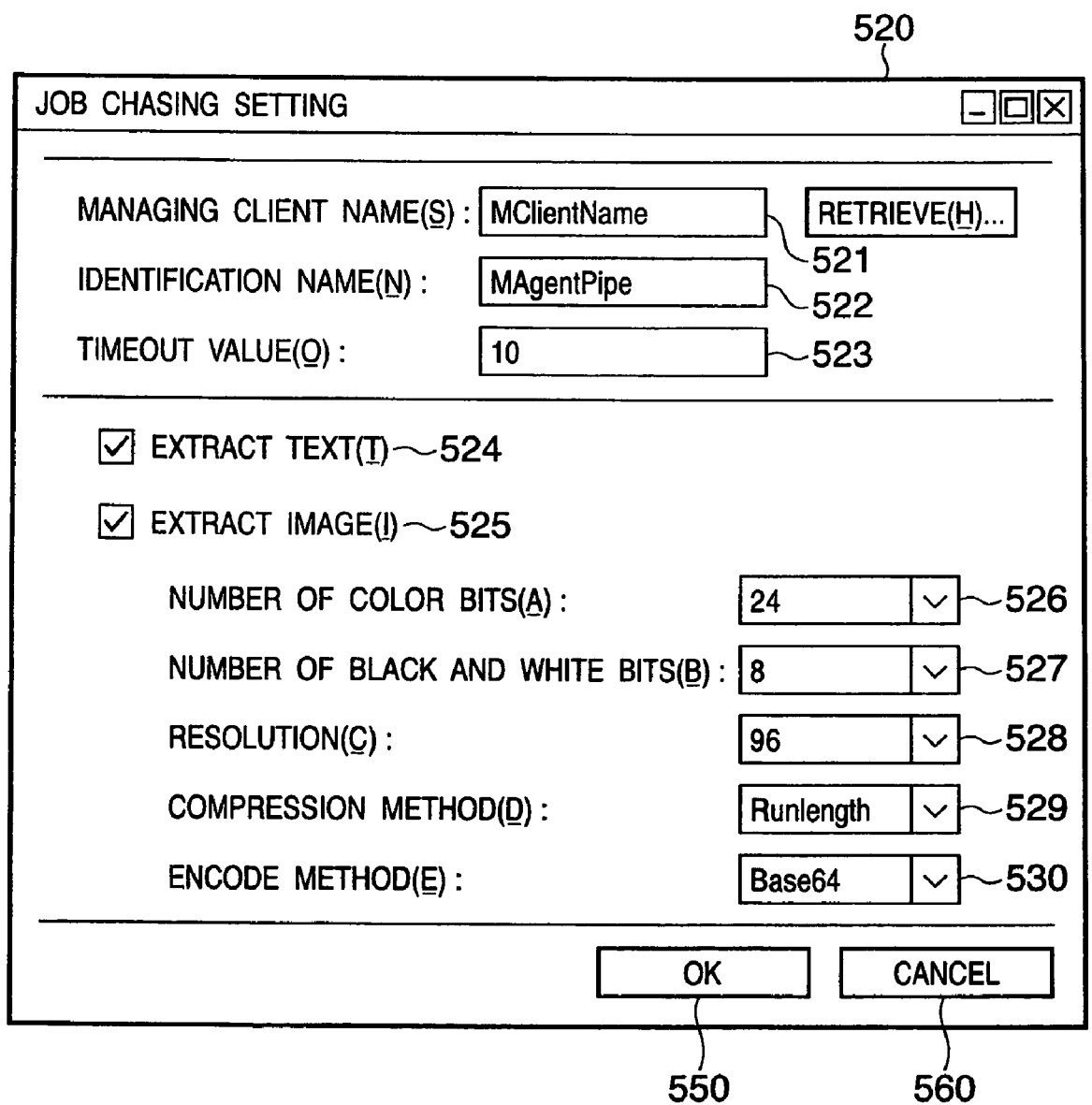
FIG. 7B is a diagram showing an example of a job chasing setting screen of the user interface for the job chasing function.

FIGS. 7A and 7B are diagrams showing an example of a user interface (hereinafter referred to as a UI) that makes settings for job chasing.

FIG. 7A shows an example of an initial screen of a user interface displayed by the job chasing function UI control unit 401 in the job chasing function unit 400. In the present embodiment, settings can be made in a property sheet "job chasing function" in a dialog box of the printer driver UI.

The setting screen for job chasing shown in FIGS. 7A and 7B may be displayed on a dedicated tool different from the print driver 203 and implemented by communicating the setting information to the add-in UI control unit 401 in the printer driver 203. In view of the operational purpose of the present system, this dialog box 510 is desirably displayed only to the users permitted to change settings for the printer. A user may be permitted to open the present dialog box only when he or she is successfully authenticated by a password, or the like or an executing user authority may be limited.

A "Job chasing" checkbox 511 in FIG. 7A instructs the job chasing function to be validated or invalidated. The user can manipulate the checkbox to controllably turn on or off the present function.

A dialog box 520 in FIG. 7B is opened by selecting a setting button 512 in FIG. 7A; the dialog box 520 is used to make detailed settings for the job chasing function. The job chasing setting dialog box is used to determine the contents of information on a destination for chasing data and of chasing data generated by the job chasing function processing unit 402.

The identification name of the computer on which the job chasing managing unit 500 is operating is input to a managing client name 521. A key enabling a distinction of this connection from the others in the job chasing managing unit 500 is input to an identification name 522. A timeout time used for communications with the job chasing managing unit 500 is preset in a timeout value 523. These three pieces of information are required to transmit chasing data.

If the job chasing managing unit 500 is operating on the computer displaying the present user interface, the identification name of the computer is set in the managing client name 521. If the job chasing managing unit 500 is operating on another computer, the identification name of that computer is input to the managing client name 521.

A "Text extracting" checkbox 524 is used to specify whether or not to contain text string information in the chasing data. Turning this checkbox on causes the printer driver 203 to extract text string information as chasing data. Adding text string information to the chasing data facilitates text retrievals after the data has been stored in the chasing information storing server 1000.

An "Image extracting" checkbox 525 is used to specify whether or not to contain page bit map information in the chasing data. Turning this checkbox on causes the printer driver 203 to generate a page bit map in addition to print data using the graphic engine 202. Adding the page bit map to the chasing data enables images to be browsed after the data has been stored in the chasing information storing server 1000.

The number of color bits 526 is used to set the number of bits per pixel if a page is to be printed in colors and if a chasing bit map for the page is held as color bit map data. In the example in FIG. 7B, one pixel is formed of 24 bits in R, G, and B (each color is displayed at 256 gray levels; a total of 16,770,000 colors are displayed).

The number of black and white bits 527 is used to set the number of bits per pixel if a monochromatic page is to be printed and if a chasing bit map for the page is held as monochromatic bit map data. In the example in FIG. 7B, one pixel is formed of 8 bits (256 gray levels).

A resolution 528 is used to set the resolution of the chasing bit map. In the example in FIG. 5B, the chasing bit map will be created at 96 DPI. A compression method 529 is used to select a method of compressing the chasing bit map. In the example in FIG. 5B, a run length compressing method is used.

An encode method 530 is used to set an encode method of transmitting chasing data (compressed text or bit map) from the host computer 300 to the chasing information storing server 1000. In the example in FIG. 7B, "Base64" is used.

The user interface having the above settings can be used to specify, in detail, the attributes and format of a page image to be generated on the basis of the chasing data.

The job chasing function UI is only illustrative, and the present invention is not limited to this. The set information is stored in the job chasing setting information area 2d, shown in FIG. 2B, and is referenced by the job chasing function unit 400 to create chasing data.

<Example of Operation of a Job Chasing Process in Accordance with the Present Embodiment>

Description will be given of an example of operation of a job chasing process in the network printing system in accordance with the present embodiment.

(Example of a Preprocess for a Job Chasing and Printing Process)

Figure 8:
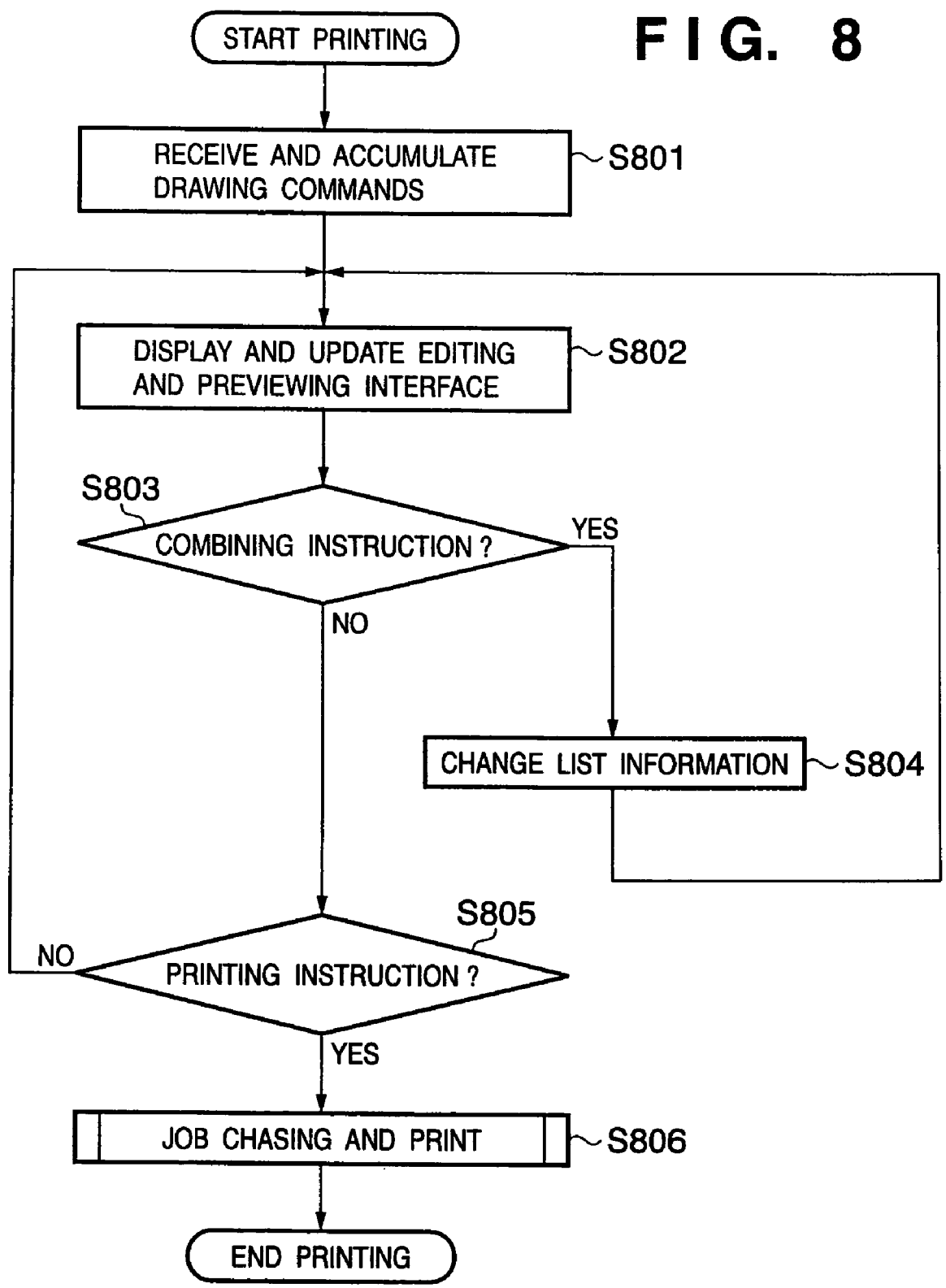
FIG. 8 is a flowchart schematically showing a job chasing preprocess in accordance with the present embodiment.

With reference to FIG. 8, description will be given of the starting process of spooling, combining, and printing jobs as described with reference to FIG. 6.

FIG. 8 is a flowchart illustrating the flow of a process executed before a job chasing and printing process is started.

After a print job is started, the spool system 300 in the printer driver 203 uses the dispatcher 301 to transmit drawing commands from the graphics engine to the spooler 302 in step S801. The drawing commands are then accumulated in spool files. Since the job combining process, included in the job editing process, is to be executed, three different print jobs from the respective applications are sequentially introduced and accumulated in the spool files 303A, 303B, and 303C, respectively.

In step S802, upon sensing that one or more jobs have been introduced, the spool file manager loads the editing and previewing interface 306 to display the spool advance of each spool file. Once spooling is finished, the editing and previewing interface 306 changes to a standby state in which it waits for the user's input.

In step S803, the spooled three spool jobs 601, 602, and 603 are instructed via the editing and previewing interface 306 to be combined together. The spool file manager 304 then changes the contents of the list information managed in the storage area on the RAM 2 so that the spool jobs 601, 602, and 603 are combined into one job. The pieces of information such as the job document names and the print application name are individually saved to the spool files 303A, 303B, and 303C. Consequently, the information is not lost immediately upon the combining instruction.

Subsequently, in step S805, a printing instruction is given through the editing and previewing interface 306. The spool file manager 304 then gives the instruction to the despooler 305 to start a "printing and job chasing process".

(Example of a Job Chasing and Printing Process)

Figure 9:
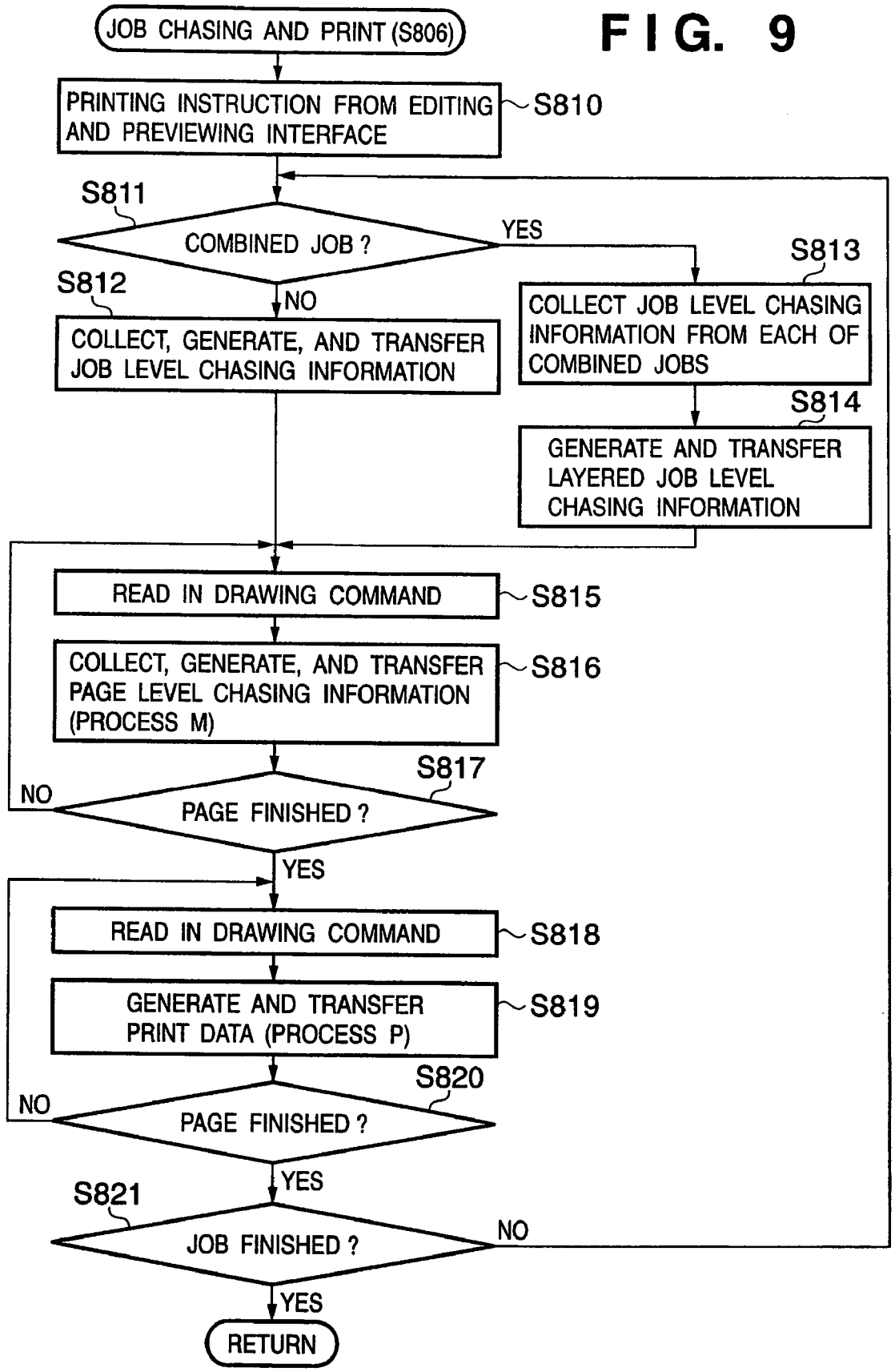
FIG. 9 is a flowchart schematically showing a job chasing and printing process in accordance with the present embodiment.

With reference to FIG. 9, a detailed description will be given of a job chasing and printing process following the process described with reference to FIG. 8.

FIG. 9 is a flowchart illustrating the detailed flow of a job chasing and printing process.

In step S810, upon receiving a printing start instruction from the editing and previewing interface 306, the spool file manger 304 first starts a job chasing process. In step S811, the spool file manger 304 determines whether or nor the print job instructed to be executed is the combination of a plurality of jobs.

More specifically, the spool file manager 304 references the list information managed in the storage area on the RAM 2 to acquire information indicating whether or not the print job instructed to be executed is the combination of a plurality of jobs, and if so, what jobs have been combined into this job. If the job is not the mixture of a plurality of jobs, the process proceeds to step S812. Otherwise the process proceeds to step S813. In step S812, the despooler 305 collects, generates, and transfers job level chasing information. Specifically, the despooler 305 reads in job level chasing information such as the job document name and print application name which relates to the entire job, from the intermediate codes in which the information is described. The job chasing function processing unit 402 converts the job level chasing information into a format readable by the job chasing managing unit 500 and the transfers the resulting information. It is possible to use the XML format or the like, or a format meeting original rules.

FIG. 10 shows a format for job level chasing information for a job. In this format, the name of a print job and the name of a printing application are extracted and described as job level chasing information.

For a combined job, in step S814, the despooler 305 reads in job level chasing information from each of the jobs contained in the combined job, on the basis of information from the spool file manager 304. This is because, even for jobs instructed to be combined, the job level chasing information on the individual jobs is saved to the spool files as intermediate codes as previously described. The acquired job level chasing information on the individual jobs in the combined job is generated by the job chasing function processing unit 402 in a formed in which the information is readable by the job chasing managing unit 500 and in which the information is layered so as to clarify a job combination relationship; the information is then transferred by the job chasing function processing unit 402.

FIG. 11 shows a format for job level chasing information on a combined job. Job names of the print job and printing application names are similarly extracted as job level chasing information. "Combined document 1" is specified as a job name for the entire combined job. The following names of the individual jobs, the components of the combined job, are described at child node positions in XML: "Thesis 1", "Graph 1", and "Spreadsheet 1". The printing application names are similarly configured. The thus layered and described job level chasing information indicates that the plurality of jobs have been combined into the single job and still includes information on the individual jobs.

In step S815, drawing commands described as intermediate data are read in for each physical page. In step S816, page level chasing information is collected, generated, and transferred (this corresponds to the process M). More specifically, if attribute information such as sheet size which relates to pages is instructed to be extracted or the job chasing function unit is instructed to extract text information, string information is extracted from a text drawing command as chasing data. If an image is instructed to be extracted, a bit map image is drawn in, for example, a memory area in which drawing commands are stored. Chasing data is thus collected and generated by executing received drawing commands and a process that depends on various settings specified for the job chasing function unit 400. The chasing data is then transferred to the job chasing managing unit 500. Subsequently, step S817 determines whether or not a job chasing information generation and transfer process has been finished for one physical page. If the process has not been finished, the procedure returns to step S815.

In step S817, if a drawing process has been finished for one physical page, the procedure proceeds to step S818 to read in drawing commands from the spool files. In succeeding step S819, the despooler 305 generates print data under an instruction from the spool file manager 304. The print data is written out to the system spooler 204 via the graphic engine 202, dispatcher 301, and drawing processing unit 203C and then transferred to the printer 1500 (this corresponds to the process P).

Step S820 determines whether or not a printing process has been finished for one physical page. If the process has not been finished, the procedure returns to step S818. If the process has been finished, the procedure proceeds to step S809. If the print job has been finished in step S809, the process is finished. If the print job has not been finished, the procedure returns to S811 to continue executing the job.

In the flowchart in FIG. 9, one page of chasing data and then one page of print data are generated. However, the present invention is not limited to this order. One page of print data and then one page of chasing data may be generated. The former procedure always finishes generating chasing data before starting printing to ensure chasing. The latter procedure starts printing the first page earlier. In either case, chasing and print data are desirably alternately generated in each page.

(Example of a Process Executed by the Spool System 300)

Now, with reference to FIGS. 12 to 16, description will be given of operations performed by the spool system 300 and job editing and previewing interface 306 during the job chasing and printing process, described with reference to FIG. 9.

Figure 12:
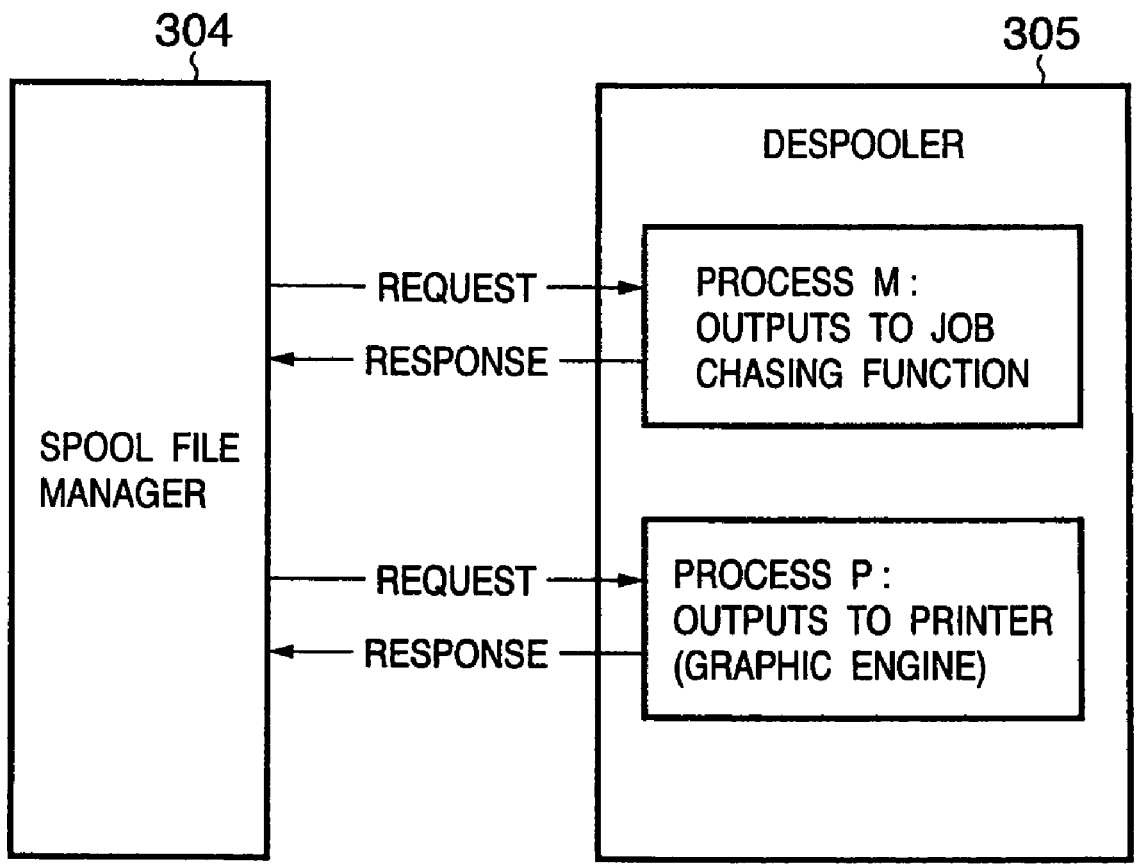
FIG. 12 is a function block diagram showing an example of a process executed by a despooler 305.

As previously shown, the despooler 305 outputs data to two destinations: the job chasing function unit 400 and the dispatcher 301. In the present embodiment, as shown in FIG. 12, two processes M and P are generated for the despooler 305 and controlled by the spool file manager 304. The first process M is utilized to for outputs to the job chasing function unit. The second process P is utilized for printing on the printer 1500. Both despool processes M and P are generated by the spool file manager 304.

Figure 14A:
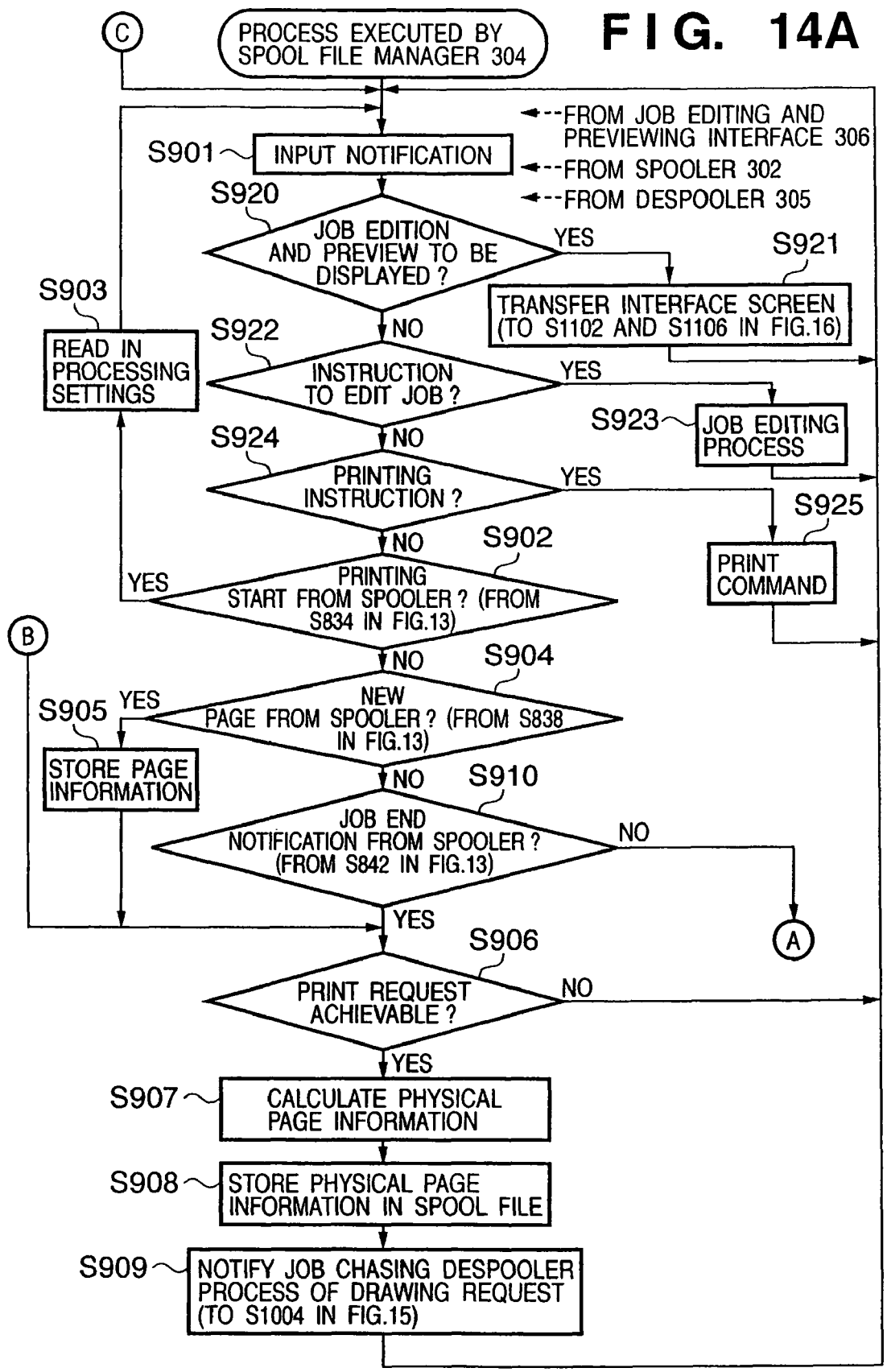
FIGS. 14A and 14B are flowcharts showing an example of a process executed by a spool file manager 304.
Figure 14B:
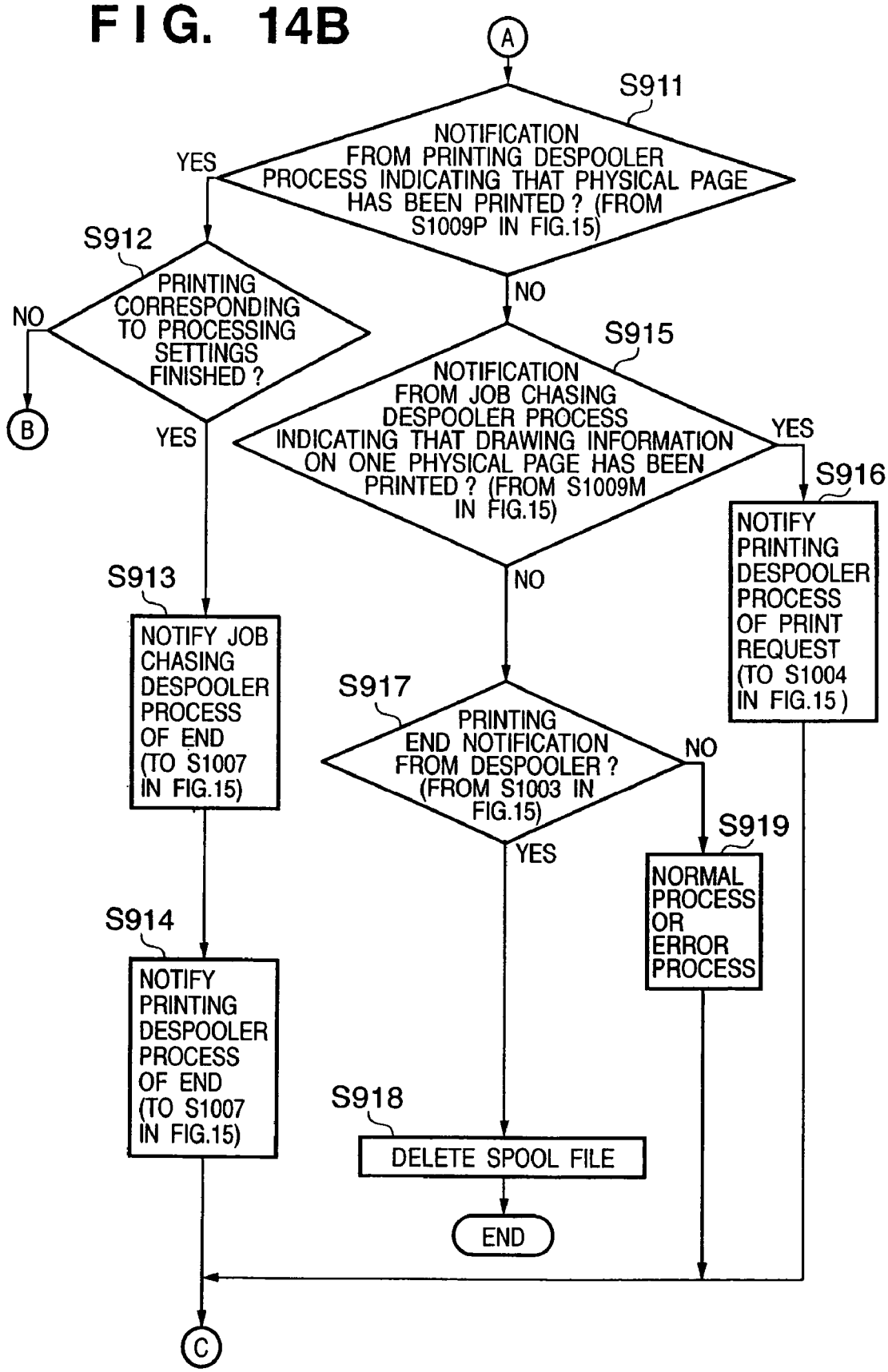
Figure 15:
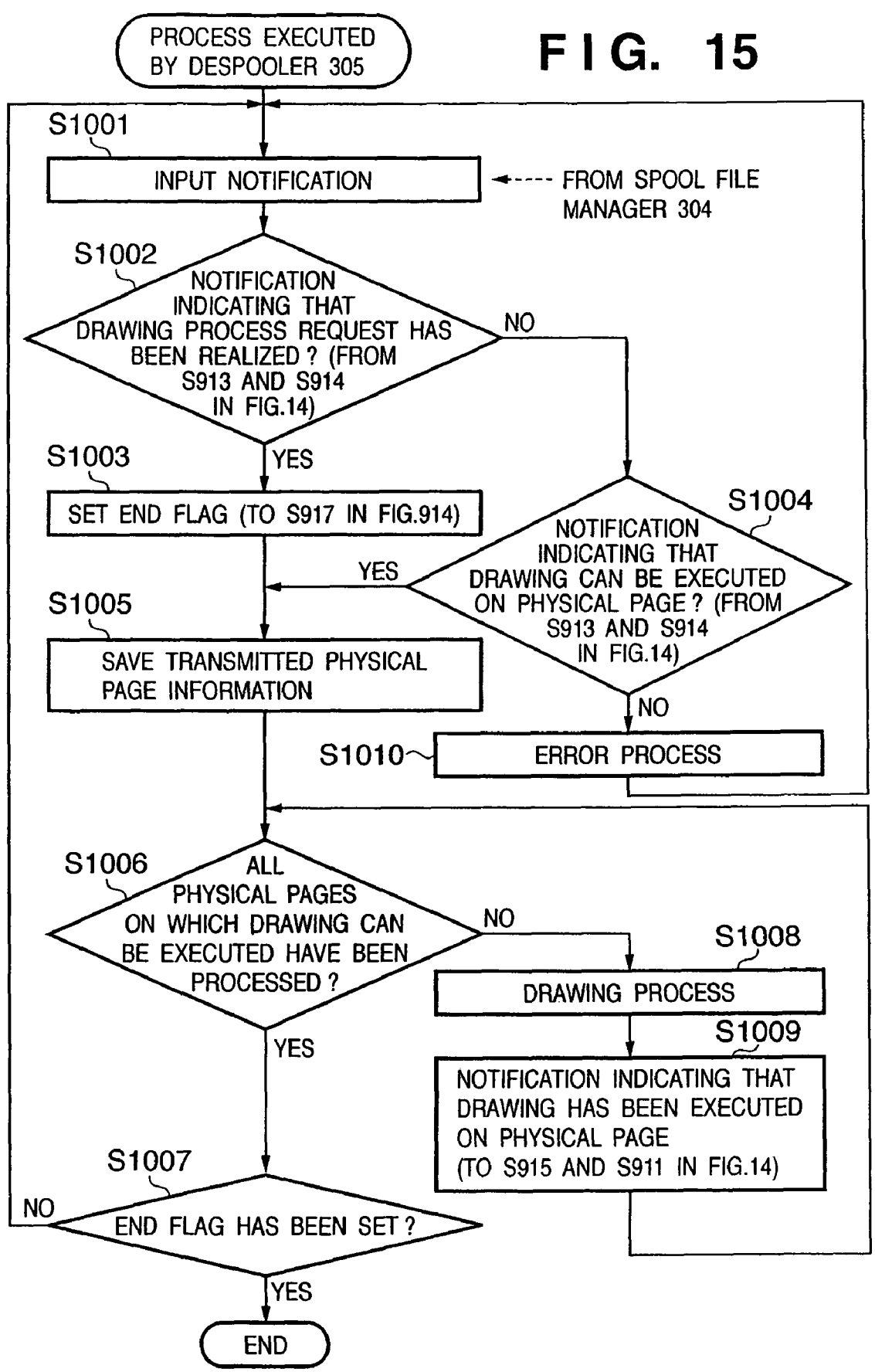
FIG. 15 is a flowchart showing an example of a process executed by the despooler 305.

With reference to FIGS. 13 to 16, a detailed description will be given of a process executed in the spool file system 300 and a process executed by the job editing and previewing interface 306. The relationship between the processes is shown in each step. However, since the two processes M and P of the despooler 305 are similar as is characteristic of the present embodiment, a common flowchart is shown in FIG. 15, with the steps of the process M shown with the final letter M and the steps of the process P shown with the final letter P.

(Example of a Process Executed by the Spooler 302)

Figure 13:
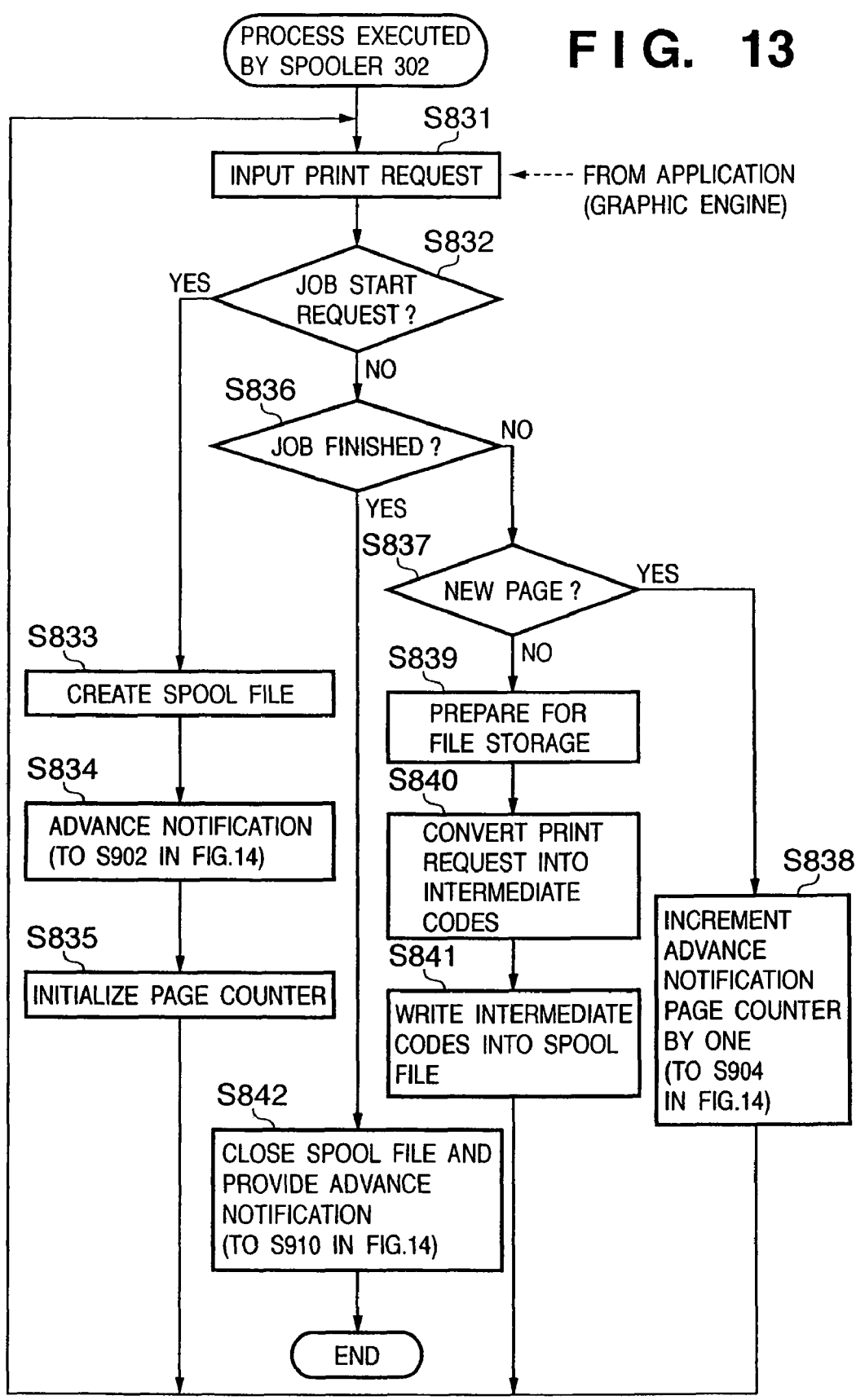
FIG. 13 is a flowchart showing an example of a process executed by a spooler 302.

FIG. 13 is a flowchart of a process executed by the spooler 302 in a page-by-page saving step in association with generation of a spool file 303.

First, in step S831, the spooler 302 receives a print request from an application via the graphic engine 202. The application can make various printing settings via the UI control unit 203B in the printer driver 203. The printing settings include an item realized by utilizing the spool system 300, such as the arrangement of a plurality of logical pages in one physical page.

In step S832, the spooler 302 determines whether or not the received print request is for the start of a job. If the spooler 302 determines in step 802 that the print request is for the start of a job, the procedure proceeds to step S833 where the spooler 302 creates a spool file 303 to which intermediate data is temporarily saved. In step S834, the spooler 302 notifies the spool file manager 304 of the advance of a printing process. Subsequently, in step S835, the spooler 302 initializes a page number counter for the spooler 302 to 1. The spool file manager 304 then reads in the information on and processing settings for the started print job from the spool file 303 for storage.

If the spooler 302 determines in step S832 that the request is not for the start of a job, the procedure proceeds to step S836. In step S836, the spooler 302 determines whether or not the received request is for the end of a job. If the spooler 302 determines that the request is not for the end of a job, the procedure proceeds to step S837 where it determines whether or not the request is for a new page. If the spooler 302 determines in step S837 that the request is for a new page, the procedure proceeds to step S838 where it notifies the spool file manager 304 of the advance of the printing process. The spooler 302 increments the page number counter, closes the page drawing file in which the intermediate codes are stored, and generates a next page drawing file.

If the spooler 302 determines in step S837 that the received print request is not for a new page, the procedure proceeds to step S839 where it gets ready to write out intermediate codes to the page drawing file. In step S840, to store the print request in the spool file 303, the spooler 302 converts the DDI function in the print request into intermediate codes. In step S841, the spooler 302 writes the print request (intermediate codes) converted into a storable format in step 840, to the spool file 303.

The procedure subsequently returns to step 831 where the spooler 302 again receives a print request from the application. The process during the series of steps S831 to S841 is continued until the spooler 302 receives a request for the end of a job from the application. The spooler 302 simultaneously acquires information such as the processing settings from the printer driver 203 and stores it in the spool file 303.

If the spooler 302 determines in step S836 that the print request from the application is for the end of a job, since all the print requests from the application have been finished, the procedure proceeds to step S832. The spooler 302 then closes the spool file and notifies the spool file manager 304 of the advance of the printing process to finish the process.

(Example of a Process Executed by the Spool File Manager 304)

FIGS. 14A and 14B are flowcharts showing the details of the interfacing between the spool file 303 generation process in the spool file manager 304 and the job editing and previewing interface 306 as well as the control during a job chasing information generation process and a print data generation process described later. A notification from the despooler 305 is shown with the final letter M if it is from the process M or with the final letter P if it is from the process P as described above.

In step S901, the spool file manager 304 receives a notification of the advance from spooler 302 or a notification of the advance of a printing process or job chasing generation process from the despooler 305.

In step S920, the spool file manager 304 determines whether or not the request is a screen display request from the job editing and previewing interface 306. If the request is for a screen, the procedure proceeds to step S921 where the spool file manager 304 transfers a user interface screen corresponding to a job edition or preview. If the request is not for a screen, the spool file manager 304 determines in step S922 whether or not the request is a job editing instruction such as a job combining, separating, or deleting instruction from the job editing and previewing interface 306. If the request is for a job edition, the procedure proceeds to step S923 where the spool file manager 304 executes a job editing process. The spool file manager 304 cooperates with the spooler 302 in executing a job edition on the spool file 303. The job edition has already been described with reference to FIGS. 5, 6A, and 6C and will thus not be described in detail.

If the request is not for a job edition, the spool file manager 304 determines in step S924 whether or not the request is a printing instruction from the job editing and previewing interface 306. If the request is for printing instruction, the procedure proceeds to step S925 where the spool file manager 304 gives a print command to cause the despooler 305 to execute the process P.

If the request does not correspond to the interfacing with the job editing and previewing interface 306, the procedure proceeds to step S902. Although FIGS. 14A and 14B show a series of steps, the interfacing with the job editing and previewing interface 306 may be achieved using an interrupt process.

In step S902, the spool file manager 304 determines whether or not the advance notification is a printing start notification provided by the spooler 302 in step S804, previously described. If the advance notification is a printing start notification, the procedure proceeds to step S903 where the spool file manager 304 reads in the printing processing settings from the spool file 303 and starts managing the job.

If the spool file manager 304 determines in step S902 that the advance notification is not a printing start notification from the spooler 302, the procedure proceeds to step S904. The spool file manager 304 then determines whether or not the advance notification is a notification provided by the spooler 302 in step S808, previously described, and indicating that one logical page has been printed, that is, whether or not a new page process is to be executed on the logical pages. If the notification indicates that one logical page has been printed, the procedure proceeds to step S905 where the spool file manager 304 stores logical page information on this logical page. The procedure then proceeds to step S906.

In step S906, the spool file manager 304 determines whether or not a drawing process for one physical page can start to be executed on already spooled n logical pages. If the drawing process can be executed, the procedure proceeds to step S907 where the spool file manager 304 determines a physical page number on the basis the number of logical pages assigned to one physical page to be printed. For the calculation of physical pages, if, for example, the processing settings are such that four logical pages are arranged in one physical page, the first physical page becomes printable when the fourth logical page is spooled. The first physical page is thus obtained. The second physical page subsequently becomes printable when the eighth logical page is spooled. Even if the total number of logical pages is not a multiple of the number of logical pages arranged in one physical page, the logical pages arranged in one physical page can be determined on the basis of the spool end notification in step S812. If the spool file manager 304 determines in step S906 that the drawing process cannot be executed, the procedure returns to step S901 where it waits for the next notification.

In step S908, the following information is stored in the spool file 303: the numbers of logical pages constituting a physical page that can now be subjected to a drawing process, and the number of this physical page. Subsequently, in step S909, a drawing request notification is transmitted to a despooler process generated for job chasing together with the stored physical page information. When a drawing process request for the first physical page is made, the process of the despooler 305 has not been generated yet. The request notification is transmitted after a job chasing process and a printing process have been generated in this step.

The procedure subsequently returns to step S901 where the spool file manager 304 waits for the next notification. In the present embodiment, a printing process can be achieved even if not all the spools of the print jobs have been finished when the logical pages constituting one physical page are spooled.

For the despooler 305 in accordance with the present embodiment, one physical page is assumed to be a unit for the printing process. In step S908, previously described, the information required to execute a printing process on one physical page is sequentially saved to a file so as to be reused. However, if the information need not be reused, an implementation may be used in which fast media such as a shared memory is used to sequentially overwrite physical pages, thus saving speed and resources. If the advance of despooling is faster than that of spooling or despooling is started after all the pages have been spooled, the spool file manager 304 receives a notification indicating that a plurality of physical pages or all the physical pages have become printable, depending on the advance of despooling, rather than receiving a notification every time one physical page becomes printable. This makes it possible to save the number of notifications.

If the spool file manager 304 does not determine in step S904 that the notification indicates that one logical page has been printed, the procedure proceeds to step S910. The spool file manager 304 determines in step S910 whether or not the notification is a job end notification provide by the spooler 302 in step S812, previously described. In the case of a job end notification, the procedure proceeds to step S906, previously described. Otherwise the procedure proceeds to step S911.

In step S911, spool file manager 304 determines whether or not the received notification is a notification from the printing process of the despooler 305 indicating that one physical page has been printed. If the notification indicates that one physical page has been printed, the procedure proceeds to step S912. Otherwise the procedure proceeds to step S915.

In step S912, the spool file manager 304 determines whether or not all of the printing corresponding to the processing settings has been finished; the spool file manager 304 has received the notification from the printing process of the despooler 305 indicating that one physical page has been printed. If the spool file manager 304 determines that the printing has been finished, the procedure proceeds to step S913 where it notifies the job chasing process of the despooler 305 that the chasing information generation process has been finished. The procedure subsequently proceeds to step S914 where the spool file manager 304 notifies the printing process of the despooler 305 that the printing has been finished. If the spool file manager 304 determines that the printing corresponding to the processing settings has not been finished, the procedure proceeds to step S906, previously described.

If the spool file manager 304 determines in step S911 that the notification does not indicate that one physical page has been printed, the procedure proceeds to step S915. The spool file manager 304 determines in step S915 whether or not the received notification is a notification from the job chasing process of the despooler 305 indicating that a drawing process has been completed on one physical page. If the notification indicates that a drawing process has been completed on one physical page, a printing process may be executed on the corresponding physical page. The procedure thus proceeds to step S916 where the spool file manager 304 requests the printing process of the despooler 305 to print the corresponding physical page. The reliability of the job chasing system can be improved by executing an actual printing process after a drawing process utilized for job chasing has been completed, as described above.

If the spool file manager 304 determines in step S915 that the notification does not indicate that a drawing process has been completed on one physical page, the procedure proceeds to step S917. The spool file manager 304 determines in step S917 whether or not the received notification is a notification from the despooler 305 indicating that the printing has been finished. If the spool file manager 304 determines that the notification is provided by the despooler 305 and indicates that the printing has been finished, the procedure proceeds to step S918. The spool file manager 304 then deletes the corresponding page drawing file from the spool file 303 to finish the process.

If the spool file manager 304 determines that the received notification is not a notification from the despooler 305 indicating that the printing has been finished, the procedure proceeds to step S919. The spool file manager 304 then executes a normal process or an error process and waits for the next notification.

(Example of a Process Executed by the Despooler 305)

FIG. 15 is a flowchart showing the details of a drawing data generation process executed by the despooler 305. The despooler 305 generates drawing data by reading required information from the spool file 303 in response to a print request from the spool file manager 304. The method of transferring drawing data generated to the printer is as described with reference to FIGS. 4B and 9.

The despooler 305 is utilized for two purposes, that is, to output job chasing information and print data, as described with reference to FIGS. 12, 14A and 14B. With respect to a drawing method, the outputting of job chasing information differs from the outputting of print data in a destination. Chasing data (for image extracting) differs from print data in the size of data generated by the graphic engine 202 and a compression method. However, printed drawing contents are exactly the same as drawing contents held in the chasing data. This enables the chasing data to be handled by the same processing system that deals with actual printing. The reliability of the chasing data can thus be improved. Description will be given below of a process of the despooler 305 common to the processes M and P.

First, in step S1001, a notification from the spool file manager 304, previously described, is input to the despooler 305. Subsequently, in step S1002, the despooler 305 determines whether or not the input notification indicates that a job has been finished. If the notification indicates that a job has been finished, the procedure proceeds to step S1003 where the despooler 305 sets an end flag. The procedure then proceeds to step S1005.

If the despooler 305 determines in step S1002 that the notification does not indicate that a job has been finished, the procedure proceeds to step S1004. The despooler 305 then determines whether or not the notification is a request for the start of drawing on one physical page which request is made in step S909 or S916, previously described. If the despooler 305 does not determine in step S1004 that the notification is a request for the start of drawing on one physical page, the procedure proceeds to step S1010 where it executes an error process. The procedure then returns to step S1001 where the despooler 305 waits for the next notification.

If the despooler 305 determines in step S1004 determines that the notification is a request for the start of printing on one physical page, the procedure proceeds to step S1005. The despooler 305 then saves the information on the printable physical pages provided in step S1005, to, for example, the RAM 2. Subsequently, in step S1006, the despooler 305 determines whether or not all the physical pages saved in step S1005 have been printed. If all the physical pages have been printed, the procedure proceeds to step S1007 where the despooler 305 determines whether or not the end flag was set in step S1003, previously described. If the end flag has been set, the despooler 305 considers that the print job has been finished. The spooler 305 notifies the spool file manager 304 that the process of the despooler 305 has been finished, to complete the process. If the despooler 305 determines in step S1007 that the end flag has not been set, the procedure returns to step S1001 where it waits for the next notification.

If the despooler determines in step S1006 that there remain printable physical pages, the procedure proceeds to step S1008. The despooler 305 sequentially reads the information on the unprocessed physical pages from the saved physical page information to read in the information required to generate drawing data.

As described with reference to FIG. 4B, the drawing process of the despooler 305 converts a drawing request command stored in the spool file 303 into a format (GDI function) that can be recognized by the graphic engine 202 and then transfers the GDI function. For example, for such a processing setting as specifies the layout of a plurality of logical pages in one physical page, a conversion is carried out in this step taking a reduced arrangement into account. Specifically, for the process shown in FIG. 15, the despooler 305 sets setting information (CreateDC( ): printing process; CreateCompatibleDC( ): generation of chasing data) varying depending on the purpose of the process, for the graphic engine 202 via an API, as described for the process shown in FIG. 9.

After executing the required printing process, the despooler 305 notifies the spool file manager 304 that print data for one physical page has been generated, in step S1009. The procedure again returns to step S1006 where the despooler 305 sequentially repeatedly executes a drawing process on physical pages for which a drawing process can start to be executed, the physical pages having been saved in step S1005.

(Example of a Process Executed by the Job Editing and Previewing Interface 306)

Figure 16:
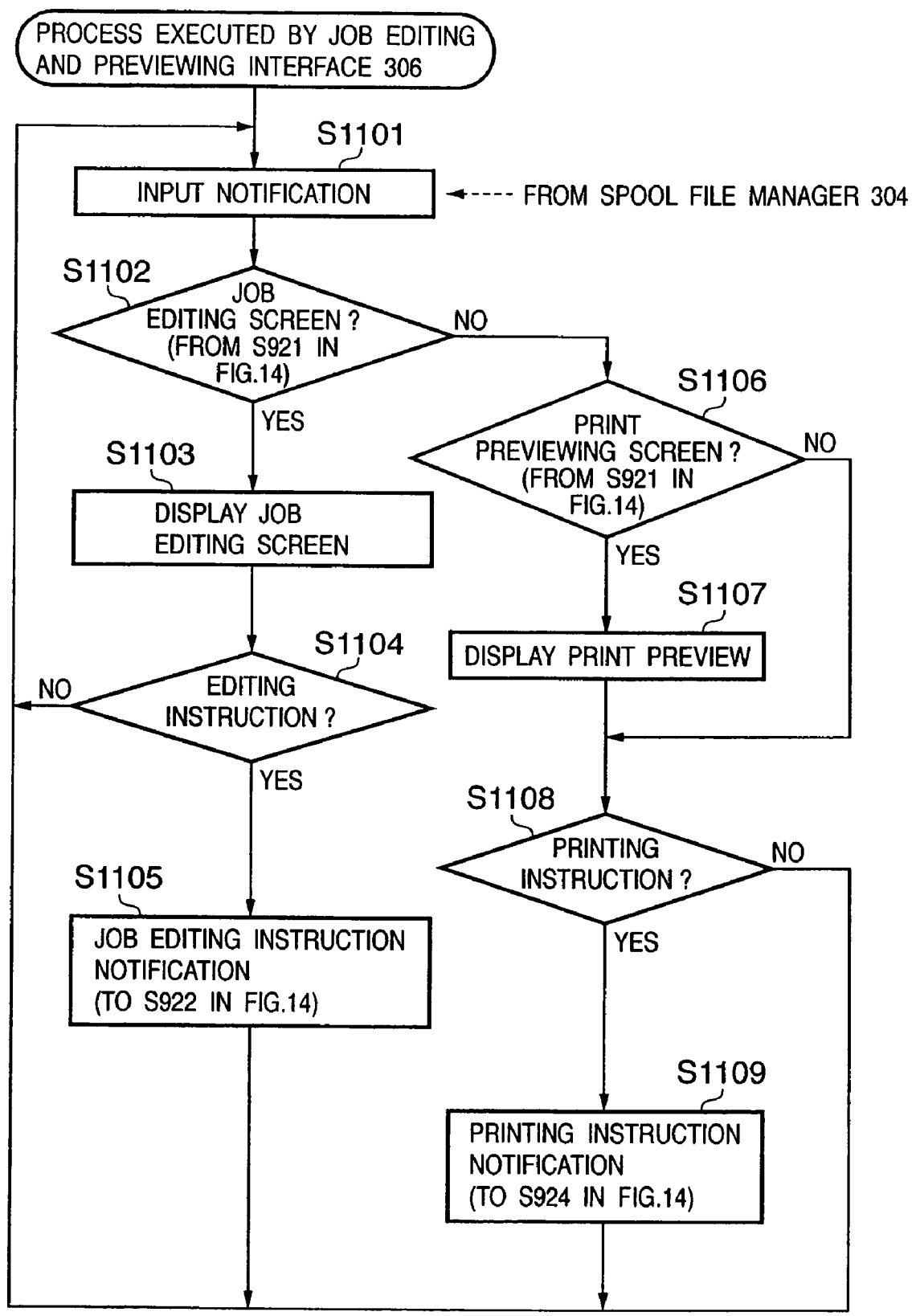
FIG. 16 is a flowchart showing an example of a process executed by a job editing and previewing interface 306.

FIG. 16 is a flowchart schematically showing an example of a process executed by the job editing and previewing interface 306.

First, in step S1101, a notification from the spool file manager 304 is input to the job editing and previewing interface 306. In steps S1102 and S1106, the job editing and previewing interface 306 determines whether the notification from the spool file manager 304 is for a job editing screen or a print previewing screen.

For a job edition, the procedure proceeds to step S1103 where the job editing and previewing interface 306 displays the job editing screen. In step S1104, the job editing and previewing interface 306 waits for the user to input an editing instruction. If the instruction is not for an edition (if the instruction is for a "return" or the like), the procedure returns to step S1101. If an editing instruction has been input, the procedure proceeds to step S1105 where the job editing and previewing interface 306 notifies the spool file manager 304 of the contents of the job editing instruction.

For a print preview, the procedure proceeds to step S1107 where the job editing and previewing interface 306 displays the print previewing screen. In step S1108, the job editing and previewing interface 306 waits for the user to input a printing instruction. If the instruction is not for printing (if the instruction is for a "return" or the like), the procedure returns to step S1101. If a printing instruction has been input, the procedure proceeds to step S1109 where the job editing and previewing interface 306 notifies the spool file manager 304 of the contents of the printing instruction.

If the notification from the spool file manager 304 is neither for the job editing screen nor for the print previewing screen, the procedure proceeds to step S1108. The job editing and previewing interface 306 then determines whether or not the instruction is for printing.

(Example of the Communication Between the Despooler 305 and the Job Chasing Function Processing Unit 402>

Figure 17:
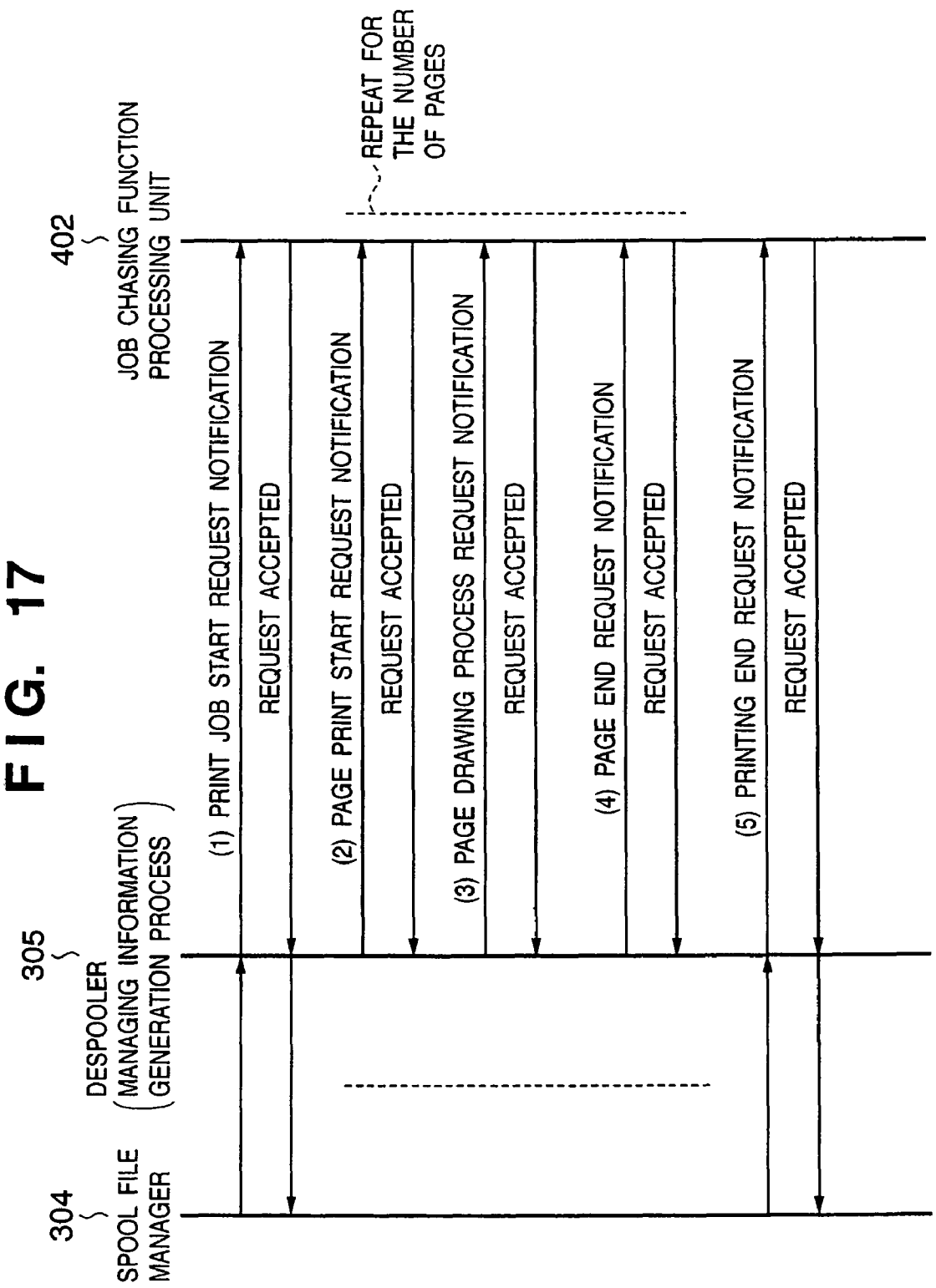
FIG. 17 is a diagram showing an example of communications between the despooler 305 and a job chasing function unit 402.

FIG. 17 is a diagram illustrating the communication between the despooler 305 and the job chasing function processing unit 402. The despooler 305 is controlled by the spool file manager 304. The spool file manager 304 instructs requests and notifications to be issued. Responses to requests are transmitted to the spool file manager 304.

The despooler 305 transmits a request corresponding to the drawing request described with reference to FIG. 15, to the job chasing function processing unit 402. The despooler 305 is notified by the job chasing function processing unit 402 that the process corresponding to each request has been finished normally, before notifying the spool file manager 304 of the advance.

The process in (1) in the figure is generated at the beginning of the drawing process executed on the first physical page in step S909 in FIG. 14A. The processes in (2) to (4) in the figure are repeated for the number of physical pages and correspond to the notifications in steps S909 and S915. The process in (5) in the figure corresponds to step S913.

(Example of a Process Executed by the Job Chasing Function Processing Unit 402)

Figure 18:
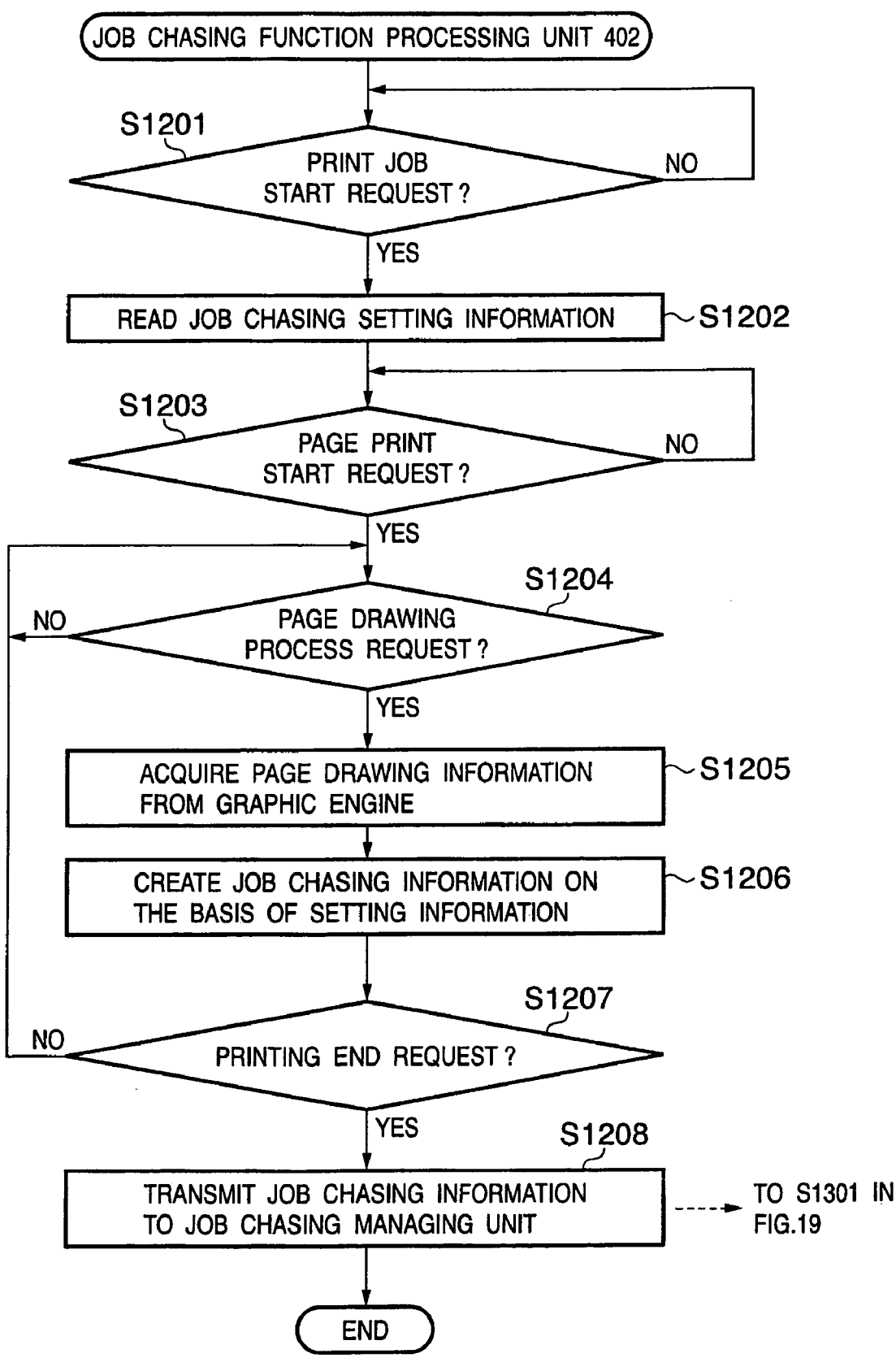
FIG. 18 is a flowchart showing an example of a process executed by the job chasing function unit 402.

FIG. 18 is a flowchart schematically showing an example of a process executed by the job chasing function processing unit 402.

In step S1201, as shown in (1) in FIG. 17, the job chasing function processing unit 402 waits for a print job start request to be sent by the spool file manager 304 via the despooler 305. Upon receiving the print job start request, the job chasing function processing unit 402, in step S1202, reads setting information set via the setting screen in FIG. 7B and stored as the job chasing setting information 2d in FIG. 2B.

In step S1203, the job chasing function processing unit 402 waits for the page print start request shown in (2) in FIG. 17. When the job chasing function processing unit 402 receives the page print start request, the procedure proceeds to step S1204 where it waits for a page drawing process request for each page. When the job chasing function processing unit 402 receives the page drawing process request, the procedure proceeds to step S1205. The job chasing function processing unit 402 then acquires page drawing information including bit map data expanded similarly to data sent to the printer 1500 by the graphic engine 202, from intermediate code data read from the spool file 303 and sent to the graphic engine 202, by the despooler 305. In step S1206, the job chasing function processing unit 402 creates chasing managing information from the page drawing information in accordance with the job chasing setting information read in step S1202. In step S1207, the job chasing function processing unit 402 determines whether or not it has received the print end request shown in (5) in FIG. 17, from the despooler 305. If the print end request has not been received, the procedure returns to step S1204 where the job chasing function processing unit 402 creates job chasing information on the next page.

Figure 19:
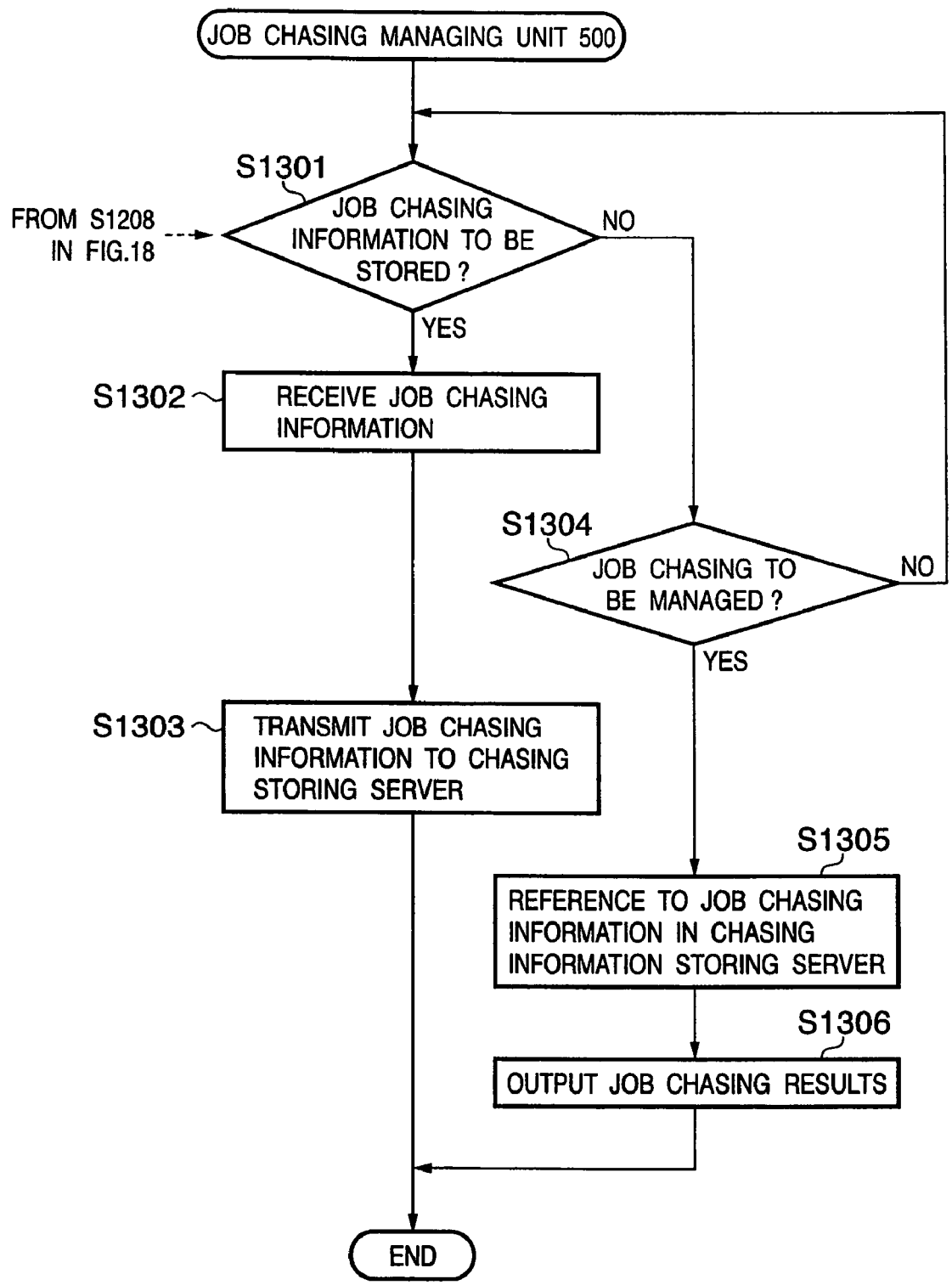
FIG. 19 is a flowchart showing an example of a process executed by a job chasing managing unit 500.

When the job chasing function processing unit 402 receives the print end request, the procedure proceeds to step S1208 where it passes the job chasing information created (in FIG. 2B, job chasing created data) to the job chasing managing unit 500. With reference to FIG. 19, description will be given below of a process executed by the job chasing managing unit 500 to which the job chasing information has been passed.

In the flow shown in FIG. 18, job chasing information on one print job is created and passed to the job chasing managing unit 500. However, in an actual operation, a plurality of print jobs may be consecutively executed. In this case, the flow shown in FIG. 18 may be repeated to sequentially pass the job chasing information on each print job to job chasing managing unit 500 or the job chasing information on a series of plural print jobs may be passed to the job chasing managing unit 500 after they have been finished. In the latter case, the job chasing function processing unit 402 waits, between steps S1207 and S1208, for a notification indicating that the series of plural print jobs have been finished.

(Example of a Process Executed by the Job Chasing Managing Unit 500)

FIG. 19 is a flowchart schematically showing an example of a process executed by the job chasing managing unit 500. An existing job chasing managing process is applicable to the present embodiment, and a detailed description of this process is thus omitted.

First, in steps S1301 and S1304, the job chasing managing unit 500 determines the request is a request for storage of job chasing information made by the job chasing function processing unit 402 or a request for a process of managing job chasing (retrieval, collation, or the like) on the basis of accumulated job chasing information.

For transmission of job chasing information, the procedure proceeds to step S1302 where the job chasing managing unit 500 receives job chasing information from the job chasing function processing unit 402. In step S1303, the job chasing managing unit 500 stores job chasing information on each job in the chasing information storing server 1000 so that the information can be chased. For a request for a job chasing managing process, the procedure proceeds to step S1305 where the job chasing managing unit 500 references the job chasing information in the chasing information storing server 1000 for each job according to the managing client name or identification name set in FIG. 7B. In step S1306, the job chasing managing unit 500 outputs job chasing results.

If the job chasing managing unit 500 is present in the host computer 3000, an instruction to execute a job chasing managing process may be given to the job chasing managing unit 500 via the application 201 or directly from the UI or via the UI control unit 203B of the printer driver 203 or the job chasing function UI unit 401. If a chasing managing computer serving as the managing client 4000 is provided besides the host computer 3000, the instruction is given via the network.

OTHER EMBODIMENTS

In the previously described embodiment, as shown in FIG. 12, two despooler processes M and P are generated for the despooler 305 and controlled by the spool file manager 304. However, the despooler 305 may internally control the two processes M and P. This can also be accomplished by slightly changing the flows of the processes in FIGS. 14A, 14B and 15. For example, the processing in steps S915 and S916 in FIG. 14B is transferred to the despooler 305 side in FIG. 15. Step S909 in FIG. 14A is simply changed to a request for the despooler 305 without any consciousness of a job chasing despool process. In steps S913 and S914, individual notifications need not be provided but a single notification has only to be provided to the despooler 305.

In the present embodiment, in step S819 in FIG. 9, the despooler 305 generates and transfers print data without the need for instructions from the spool file manager 304.

[Example of Various Embodiments of System Configurations]

FIGS. 20A to 20E are diagrams illustrating how the present invention is implemented in various systems.

Figure 20A:
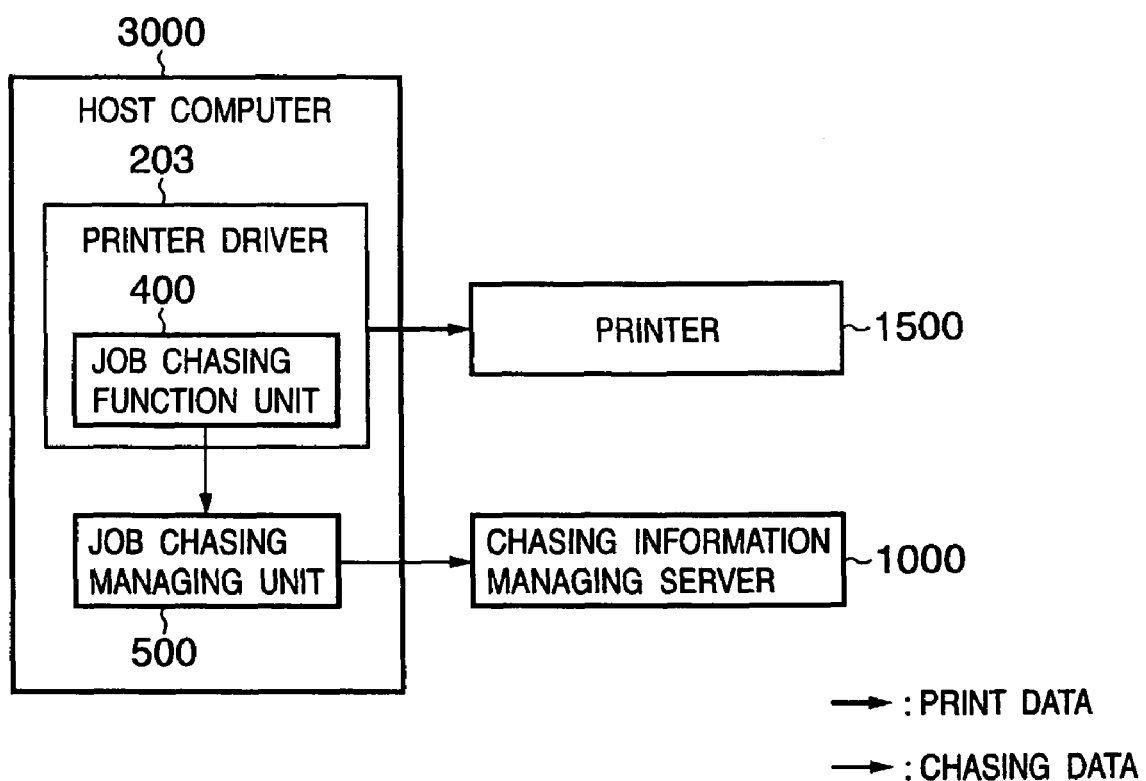
FIG. 20A is a diagram showing an example of a form of a job chasing function of a system in accordance with the present embodiment.

FIG. 20A is the simplest example of implementation of the present invention. The job chasing managing unit 500 is placed in the host computer 3000. Print data is transferred from the printer driver 203 directly to the printer 1500. Chasing data is sent from the job chasing function unit 400 to the chasing information managing server 1000 via the job chasing function managing unit 500 in the host computer 3000. This is the minimum configuration in which the present invention is implemented. The first embodiment has been described in conjunction with the form using the present configuration.

Figure 20B:
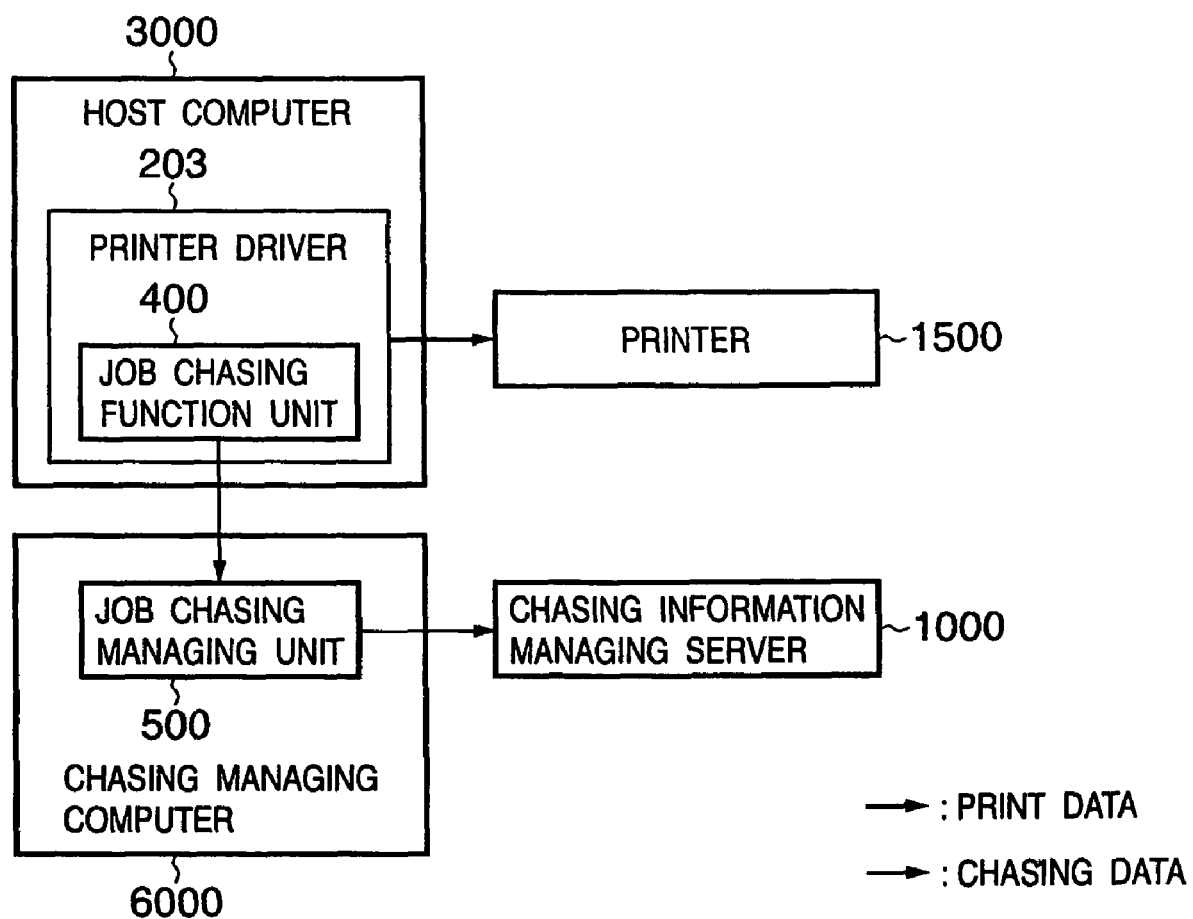
FIG. 20B is a diagram showing an example of a form of a job chasing function of another system to which the present invention is applicable.

In contrast to FIG. 20A, in FIG. 20B, the job chasing managing unit 500 is placed in a chasing managing computer 6000 different from the host computer 3000. As in the case of FIG. 16A, print data is transferred from the printer driver 203 directly to the printer 1500. Chasing data is sent from the job chasing function unit 400 to the chasing information managing server 1000 via the job chasing function managing unit 500 in the chasing managing computer 6000. The present configuration enables chasing information managing server 1000 for chasing data to be scheduled, for example, to operate on days or in time zones when a network load is light. This makes it possible to reduce a load on the chasing information managing server 1000.

Figure 20C:
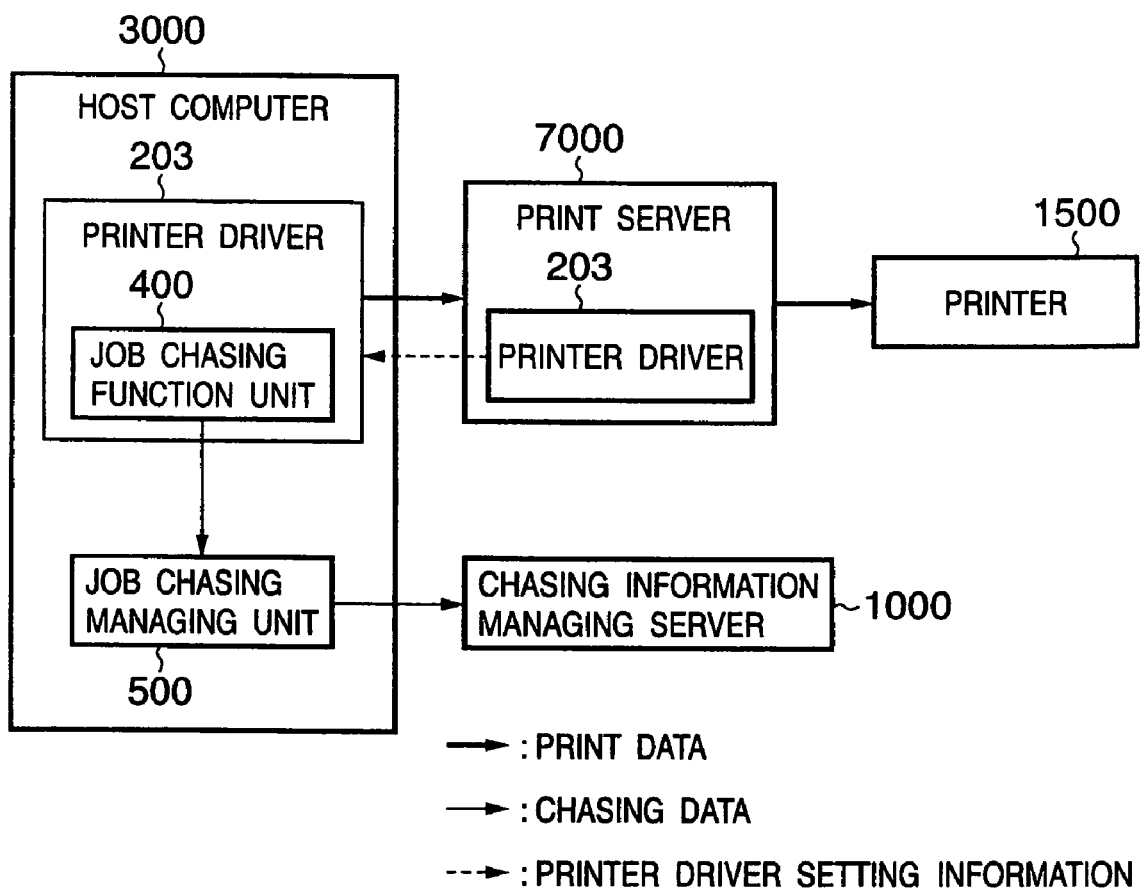
FIG. 20C is a diagram showing an example of a form of a job chasing function of another system to which the present invention is applicable.

In contrast to FIG. 20A, in FIG. 20C, a print server 7000 is interposed between the host computer 3000 and the printer 1500. Print data is transferred from the printer driver 203 to the printer 1500 through a corresponding printer queue (print spooler) in the print server 7000. Chasing data is sent from the job chasing function unit 400 to the chasing information managing server 1000 via the job chasing function managing unit 500 in the host computer 3000 as in the case of FIG. 20A. The present configuration enables the present invention to be applied to any implementation using the print server 7000. Placing the printer driver 203 in the print server 7000 enables the printer driver to be distributed to the host computer 3000 so that the print server 7000 can synchronize with and share setting information with the host computer 3000. Various settings relating to the job chasing function can all be managed on the print server 7000. A mechanism is also provided which inhibits users unauthorized to execute various settings for the job chasing function from altering the settings.

Figure 20D:
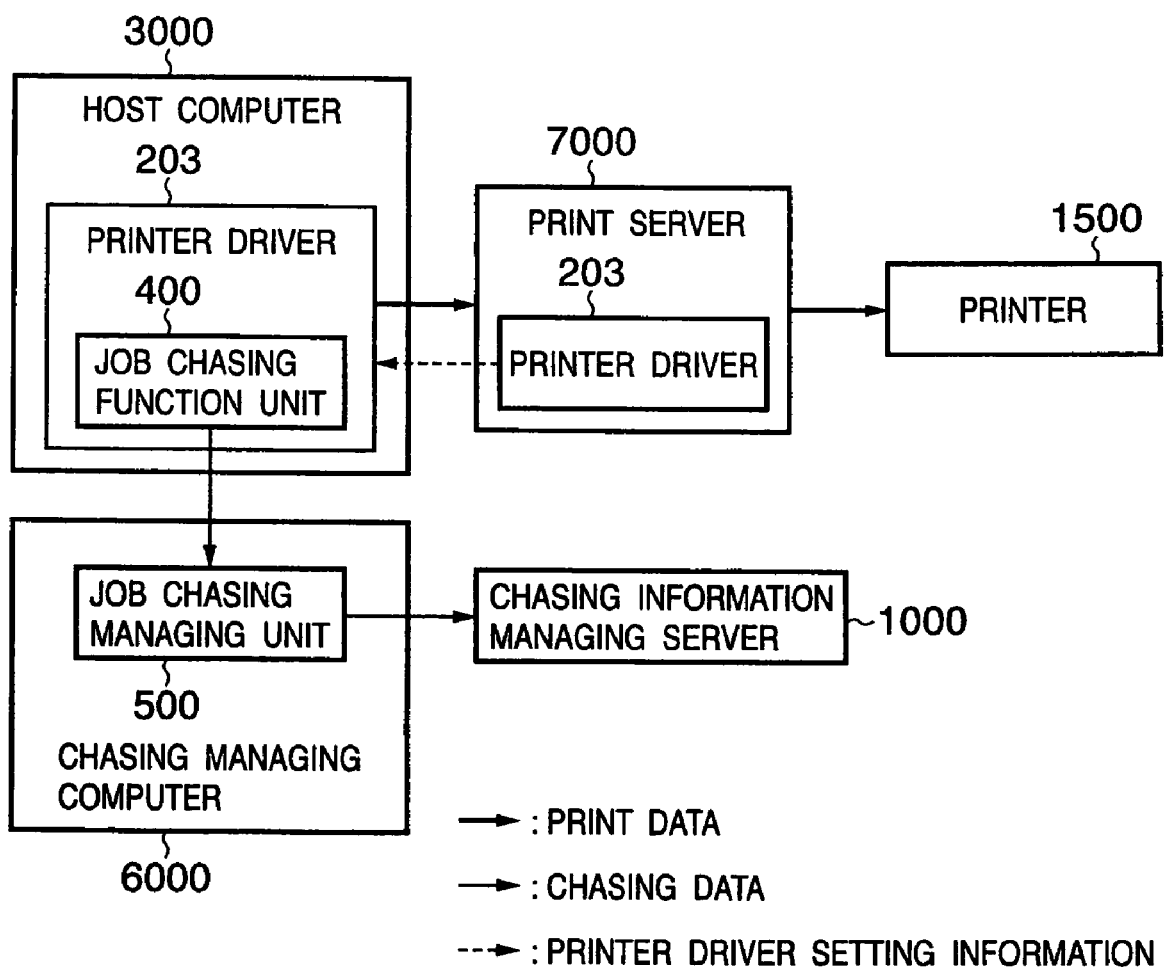
FIG. 20D is a diagram showing an example of a form of a job chasing function of another system to which the present invention is applicable.

FIG. 20D shows the mixture of the configurations in FIGS. 20B and 20C. The print server 7000 is interposed between the host computer 3000 and the printer 1500. The job chasing managing unit 500 is placed in the chasing managing computer 6000, which is different from the host computer 3000. Print data is transferred from the printer driver 203 to the printer 1500 through the corresponding printer queue (print spooler) in the print server 7000 as in the case of FIG. 16C. Chasing data is sent from the job chasing function unit 400 to the chasing information managing server 1000 via the job chasing function managing unit 500 in the chasing managing computer 6000 as in the case of FIG. 20B. The present configuration gives the advantages of both configurations in FIGS. 20B and 20C.

Figure 20E:
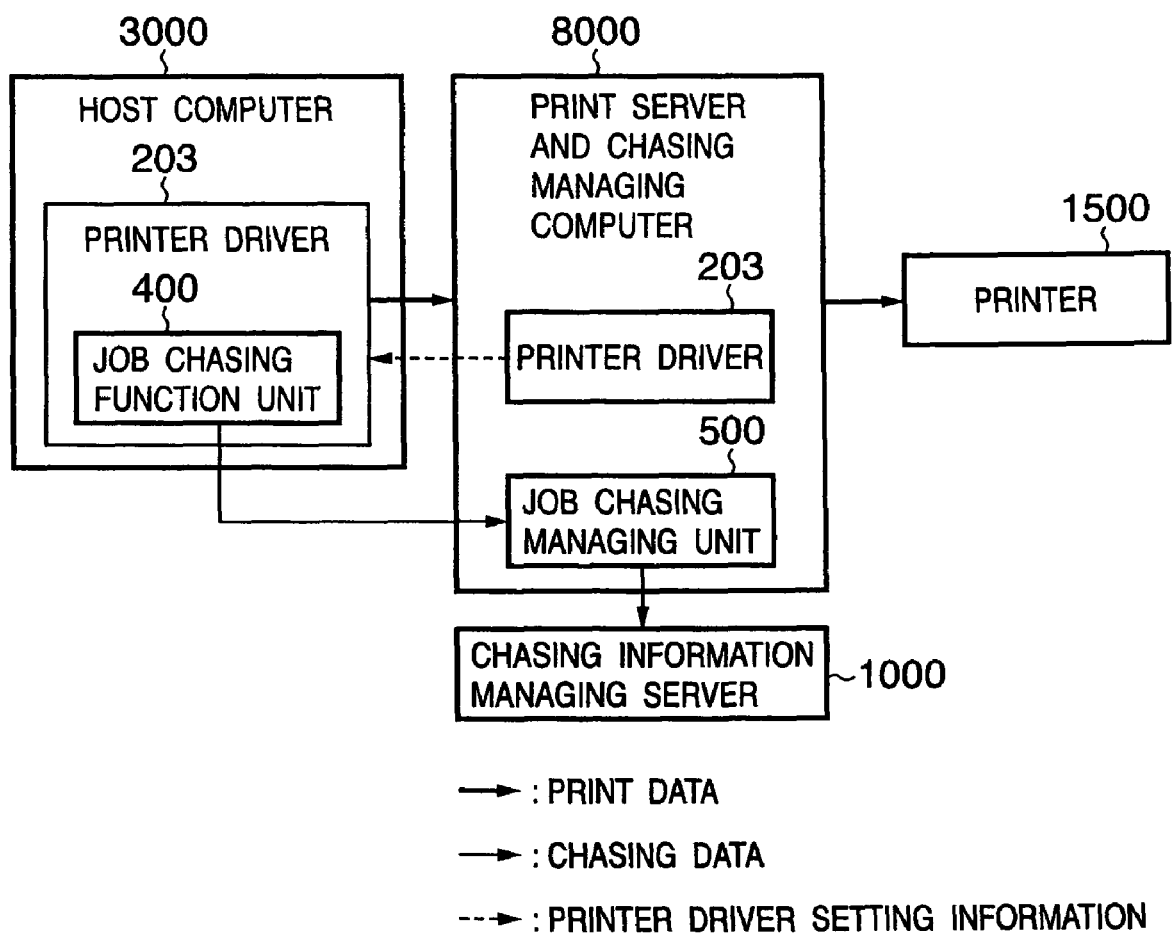
FIG. 20E is a diagram showing an example of a form of a job chasing function of another system to which the present invention is applicable.

In FIG. 20E, a print server and chasing managing computer 8000 is provided so that the chasing managing computer 6000 and print server 7000 in FIG. 20D are implemented on the same computer 8000. Print data is transferred from the printer driver 203 to the printer 1500 through a corresponding printer queue (print spooler) in the print server and chasing managing computer 8000. Chasing data is sent from the job chasing function unit 400 to the chasing information managing server 1000 via the job chasing function managing unit 500 in the print server and chasing managing computer 8000. The present configuration integrates the two computers in FIG. 20D, the chasing managing computer 6000 and print server 7000, into the single print server and chasing managing computer 8000. This reduces installation spaces and costs.

The present invention is applicable to various forms such as those described above. It is thus possible to provide not only the minimum configuration described with reference to FIG. 20A and in conjunction with the above implementation but also flexible system configurations corresponding to introduction forms.

The present invention is applicable to a system composed of a plurality of apparatuses (for example, a computer, an interface apparatus, a reader, and a printer) or to a single apparatus (a copier, a printer, or a facsimile machine).

The objects of the present invention are also accomplished by providing storage media storing program codes that realize the procedures in the flowcharts shown in the previously described embodiments and allowing a computer (or a CPU or MPU) in a system or apparatus to read and execute the program codes stored in the storage media.

In this case, the program codes read from the storage media execute the functions of the previously described embodiments. The storage media storing the program codes constitute the present invention.

Examples of the storage media supplying the program codes include, for example, a floppy (registered trade mark) disk, a hard disk, an optical disk, a magneto optic disk, a CD-ROM, a CD-R, a magnetic tape, a nonvolatile memory card, and a ROM.

The functions of the previously described embodiments may be realized not only by executing the program codes read by the computer but also by allowing an OS (Operating System) or the like operating on the computer to execute a part or all of the actual process on the basis of instructions indicated by the program codes.

The functions of the previously described embodiments may be realized by writing the program codes read from the storage media into a memory provided in an expanded board inserted into the computer or an expanded unit connected to the computer and allowing a CPU or the like provided in the expanded board or unit to execute a part or all of the actual process.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-077615, filed on Mar. 17, 2005, which is hereby incorporated by reference herein in its entirety.

What is claimed is:

1. An information processing apparatus that generates a print job to be executed by a printing device, comprising:
   storage means for storing drawing commands corresponding to a plurality of documents outputted by applications;
   editing means for editing the drawing commands corresponding to the plurality of documents stored by said storage means so as to be combined to generate the print job, in accordance with an editing instruction inputted through input means;
   chasing data generation means for executing (i) a first chasing data generation process of generating chasing data in a job level, the chasing data indicating a relation between the print job and the plurality of documents, from the drawing commands corresponding to the plurality of documents stored by said storage means and the drawing commands edited by said editing means, wherein the chasing data in the job level includes either names of the plurality of documents or names of the applications, and for executing (ii) a second chasing data generation process of generating chasing data which represents drawing contents in a page unit included in the print job, from the drawing commands edited by said editing means;
   print data generation means for executing a print data generation process of generating print data corresponding to a page of the print job from the drawing commands edited by said editing means; and
   control means for controlling to execute the print data generation process subsequent to the chasing data generation process, regarding each page of the print job.

2. The apparatus according to claim 1, wherein: said chasing data generation means generates the first chasing data in a layered data structure to indicate a combinative relationship, among the drawing commands corresponding to the plurality of documents.

3. The apparatus according to claim 1, further comprising outputting means for outputting, on a screen, a previewing image for the print data generated by said print data generation means,
   said input means input an instruction to preview the print data generated by said print data generation means.

4. The apparatus according to claim 1, wherein a user interface of a printer driver is used as the input means.

5. A method of protecting leakage of information in an information processing apparatus that generates a print job to be executed by a printing device, the method comprising the steps of:
   editing drawing commands corresponding to a plurality of documents which are outputted by applications and stored in storage means so as to be combined to generate a print job, in accordance with an editing instruction inputted through input means;
   executing (i) a first chasing data generation process of generating chasing data in a job level, the chasing data indicating a relation between the print job and the plurality of documents, from the drawing commands corresponding to the plurality of documents stored by said storage means and the drawing commands edited in said editing step, wherein the chasing data in the print job level includes either names of the plurality of documents or names of the applications, and executing (ii) a second chasing data generation process of generating chasing data which represents drawing contents in a page unit included in the print job, from the drawing commands edited in said editing step;
   executing a print data generation process of generating print data corresponding to a page of the print job from the drawing commands edited in said editing step; and
   controlling to execute the print data generation process subsequent to the chasing data generation process, regarding each page of the print job.

6. The method according to claim 5, wherein: said executing process generates a first chasing data in a layered data structure to indicate a combinative relationship among the drawing commands corresponding to the plurality of documents.

7. The method according to claim 5, further comprising:
   outputting, on a screen, a previewing image for the print data generated in said step of executing the print data generation process,
   inputting an instruction to preview the print data generated in said step of executing the print data generation process.

8. The method according to claim 5, wherein a user interface of a printer driver is used in the inputting step.

9. A non-transitory computer-readable storage medium which stores a printer driver program causing a processor to protect leakage of information in an information processing apparatus that generates a print job to be executed by a printing device, said printer driver program comprising the steps of:

editing drawing commands corresponding to a plurality of documents which are outputted by applications and stored in storage means so as to be combined to generate the print job, in accordance with an editing instruction inputted through input means;

executing (i) a first chasing data generation process of generating chasing data in a job level, the chasing data indicating a relation between the print job and the plurality of documents, from the drawing commands corresponding to the plurality of documents stored by said storage means and the drawing commands edited in said editing step, wherein the chasing data in the job level includes either names of the plurality of documents or names of the applications, and executing (ii) a second chasing data generation process of generating chasing data which represents drawing contents in a page unit included in the print job, from the drawing commands edited in said editing step;

executing a print data generation process of generating print data corresponding to a page of the print job from the drawing commands edited in said editing step; and controlling to execute the print data generation process subsequent to the chasing data generation process, regarding each page of the print job.

\* \* \* \* \*